(12) United States Patent
Takagi et al.

(10) Patent No.: US 6,956,073 B2
(45) Date of Patent: Oct. 18, 2005

(54) FLAME-RETARDANT RESIN COMPOSITION

(75) Inventors: Makoto Takagi, Chiyoda-ku (JP); Tetsuya Aibara, Chiyoda-ku (JP)

(73) Assignee: Teijin Chemicals, Ltd., Tokyo (JP)

( * ) Notice: Subject to any disclaimer, the term of this patent is extended or adjusted under 35 U.S.C. 154(b) by 193 days.

(21) Appl. No.: 10/466,890

(22) PCT Filed: Nov. 21, 2002

(86) PCT No.: PCT/JP02/12177

§ 371 (c)(1), (2), (4) Date: Jul. 22, 2003

(87) PCT Pub. No.: WO03/044090

PCT Pub. Date: May 30, 2003

(65) Prior Publication Data

US 2004/0063824 A1 Apr. 1, 2004

(30) Foreign Application Priority Data

Nov. 22, 2001 (JP) .................................. 2001-357337

(51) Int. Cl.$^7$ .............................................. C08K 5/523
(52) U.S. Cl. ...................... 524/127; 524/140; 524/141; 524/145
(58) Field of Search ................ 524/127, 140–141, 524/145, 497

(56) References Cited

U.S. PATENT DOCUMENTS

| | | | |
|---|---|---|---|
| 5,061,745 A | 10/1991 | Wittmann et al. | |
| 5,455,292 A | 10/1995 | Kakegawa et al. | |
| 5,616,768 A | 4/1997 | Kawata et al. | |
| 5,663,280 A | * 9/1997 | Ogoe et al. | 528/196 |
| 5,900,446 A | * 5/1999 | Nishihara et al. | 524/127 |
| 6,133,360 A | 10/2000 | Barren et al. | |
| 6,369,141 B1 | 4/2002 | Ishii et al. | |
| 6,486,241 B2 | 11/2002 | Sawano | |
| 2002/0147256 A1 | 10/2002 | Eckel et al. | |
| 2002/0151624 A1 | 10/2002 | Kobayashi | |
| 2003/0065092 A1 | 4/2003 | Takagi | |
| 2003/0158305 A1 | 8/2003 | Campbell et al. | |

FOREIGN PATENT DOCUMENTS

| | | |
|---|---|---|
| EP | 0 509 506 | 10/1992 |
| EP | 0 936 244 | 8/1999 |
| JP | 59-37304 | 9/1984 |
| JP | 2-32154 | 2/1990 |
| JP | 2-18336 | 4/1990 |
| JP | 5-1079 | 1/1993 |
| JP | 6-80885 | 3/1994 |
| JP | 7-53876 | 2/1995 |
| JP | 8-12811 | 1/1996 |
| JP | 8-67685 | 3/1996 |
| JP | 8-73654 | 3/1996 |
| JP | 9-176471 | 7/1997 |
| JP | 9-249768 | 9/1997 |
| JP | 10-168227 | 6/1998 |
| JP | 11-60743 | 3/1999 |
| JP | 11-130954 | 5/1999 |
| JP | 11-310695 | 11/1999 |
| JP | 11-315200 | 11/1999 |
| JP | 2000-169686 | 2/2000 |
| JP | 2000-72962 | 3/2000 |
| JP | 2000-319494 | 11/2000 |
| JP | 2001-2945 | 1/2001 |
| JP | 2001-2945 A | 1/2001 |
| JP | 2001-151787 | 6/2001 |
| JP | 2002-528588 | 9/2002 |
| JP | 2003-82159 | 3/2003 |
| WO | 00/39210 | 7/2000 |
| WO | 00/58394 | 10/2000 |
| WO | 01/72900 | 10/2001 |

\* cited by examiner

*Primary Examiner*—Peter Szekely
(74) *Attorney, Agent, or Firm*—Wenderoth, Lind & Ponack, L.L.P.

(57) ABSTRACT

A flame-retardant resin composition comprising (A)(1) a resin component containing an aromatic polycarbonate resin and a styrene-containing resin or (2) a resin component containing a polyphenylene ether resin and a polystyrene, and (B) a flame retardant that is a phosphoric ester of the following formula (I), $$R1-(O)_a-\overset{O}{\underset{(O)_b}{\overset{\|}{P}}}-O-\underset{(R7)_{m1}}{\underbrace{\phantom{XXX}}}-\underset{R6}{\overset{R5}{C}}-\underset{(R8)_{m2}}{\underbrace{\phantom{XXX}}}-O-\overset{O}{\underset{(O)_c}{\overset{\|}{P}}}-(O)_d-R4 \quad (I)$$
$$\phantom{XXXXXXX} R2 \phantom{XXXXXXXXXXXXXXXXXXXXXXXX} R3 \phantom{XXX}_n$$

wherein each of R1, R2, R3 and R4 is independently an aryl group having 6 to 12 carbon atoms, each of R5 and R6 is independently methyl or a hydrogen atom, each of R7 and R8 is methyl, m1 and m2 are 0 or integers of 1 or 2, each of a, b, c and d is independently 0 or 1, and n is 0 or an integer of 1 or 5.

29 Claims, 1 Drawing Sheet

FLAME-RETARDANT RESIN COMPOSITION

DETAILED DESCRIPTION OF THE INVENTION

1. Field of the Invention

The present invention relates to a flame-retardant resin composition. More specifically, it relates to a flame-retardant resin composition containing an aromatic polycarbonate resin or a polyphenylene ether resin as a main resin component and containing, as a flame retardant, a phosphoric ester having a specific polymerization degree. Still more specifically, it also relates to a flame-retardant resin composition excellent in flame retardancy in the form of a product having a small wall thickness, excellent in impact resistance and, further, suitable for forming a product having a small wall thickness and a flame-retardant resin composition that contains titanium-dioxide as a pigment and is remarkably improved in hydrolysis resistance.

2. Prior Art

Thermoplastic resins are not only excellent in processability but also excellent in impact resistance, etc., and have excellent properties, so that they are widely used in the fields of electric and electronic machines and equipment, OA machines and equipment, automobile parts, and the like. Since, however, thermoplastic resins are easily combustible when used alone, flame-retardant resin compositions improved in flame retardancy by incorporating various flame retardants such as a halogen compound, a metal compound and a phosphorous compound have been proposed for use in fields that require flame retardancy. However, when a halogen compound is added, the halogen compound itself undergoes pyrolysis to generate hydrogen halide during molding and sometimes causes a problem such as corrosion of a metal or pyrolysis of a resin per se. Further, in a resin composition containing a halogen compound as a flame retardant, a corrosive gas generated during its combustion causes a problem to be solved in some cases. A metal compound as a flame retardant has a very low flame-retarding effect, so that it is required to incorporate a large amount thereof for obtaining a sufficient flame-retarding effect. As a result, there is caused a problem that the properties inherent to a resin are impaired. For overcoming these problems, organic phosphoric esters have come to be used as a flame retardant in recent years.

For example, JP-A-2-32154 discloses a resin composition which contains a polycarbonate resin and a styrene-based resin and contains a monophosphoric ester compound like a triphenyl phosphate as a flame retardant but which contains no halogen compound as a flame retardant. However, the above flame retardant is easily volatile during molding and potentially has problems such as pollution of a mold and bleeding out of the flame retardant onto a molded article surface. In a molded product having a small wall thickness, particularly, these problems are liable to appear conspicuously due to a high processing temperature. For overcoming the above problems, a resin composition containing an oligomer type phosphoric ester compound has been proposed. For example, JP-B-2-18336 proposes a flame-retardant resin composition containing a thermoplastic resin and an oligomer type phosphoric ester compound composed of a resorcinol bis(diphenylphosphate) compound as a main component. However, the above phosphoric ester oligomer is easily hydrolyzable at a high temperature under a high humidity, and as a result, there is involved a problem that the resin composition is decreased in flame retardancy and mechanical strength.

In recent years, further, there is a continual decrease in the wall thickness of molded products for electric and electronic machines and equipment, OA machines and equipment and the like, which are required to have flame retardancy. Resin compositions are therefore demanded to have flame retardancy as a product having a small wall thickness (that is, higher flame retardancy), and various proposals have been made. For example, it has been proposed to use, as a flame. retardant, a mixture composed mainly of bisphenol A bis (diphenylphosphate) (to be sometimes simply referred to as "bisphenol A type phosphate oligomer" hereinafter) as a phosphoric ester oligomer, as will be explained below.

JP-A-8-73654 discloses that a resin composition containing a bisphenol A type phosphate oligomer satisfying a specific viscosity condition and a thermoplastic resin has excellent rigidity and capability of causing decreased fumes during molding. Further, it discloses a polymerization degree distribution that the phosphoric ester oligomer preferably has for satisfying the above viscosity condition.

JP-A-9-249768 discloses a bisphenol A type phosphate oligomer having a diarylphosphoric acid content of 1% by weight or less, having a total metal content of 30 ppm or less and having a TGA weight loss, measured under specific conditions, of 15% by weight or less. Further, the above laid-opening publication specifically describes the polymerization degree distribution of the above phosphate oligomer. It is disclosed that a resin composition containing such a phosphate oligomer causes less volatile gasses and causes less metal corrosion.

However, the above-disclosed bisphenol A type phosphate oligomer has left room for further improvements in flame retardancy of a product having a small wall thickness, impact resistance and moldability for a product having a small wall thickness.

JP-A-9-326325 discloses a bisphenol A type phosphate oligomer which is obtained by reacting diphenylphosphoryl chloride with bisphenol A in the presence of an aluminum chloride catalyst and which causes less volatile gasses (heat weight loss). While the above phosphate oligomer can be ideally obtained in the form of bisphenol A bis (diphenylphosphate) alone, the phosphate oligomer that can be actually obtained has not been that which can be said to be satisfactory, as is clear from values of its heat weight loss. Further, concerning a phosphoric ester produced by the above synthesis method, it is known that diphenylphosphoryl chloride as a raw material is formed in a state where the amount of byproducts is very large, as is disclosed in JP-A-5-1079, so that the above method cannot be said to be industrially suitable in view of the above point.

Further, JP-A-2000-319494 describes a bisphenol A type phosphate oligomer having a monophosphorus compound content of 0.8% by weight and having an average condensation degree N of 1.12. The above laid-opening publication further discloses that a phosphate oligomer containing triphenyl phosphate is improved in shear sensitivity so that it is suitable for forming a product having a small wall thickness.

However, the bisphenol A type phosphate oligomer disclosed in the above laid-opening publication still has left room for improvements in flame retardancy of a product having a small wall thickness, impact resistance and moldability for a product having a small wall thickness. When it is required to increase the rigidity and strength of a molded article to cope with a decrease in wall thickness of the molded article, there are many cases where convex-shaped beams, or so-called ribs, are formed on a reverse surface of the molded article. In such cases, the above improvements are particularly required to a greater extent. With a decrease in the wall thickness of a molded article, the thickness of the rib also decreases, and the flowability of a resin composition is increasingly hampered. In large-scale business machines and equipment, such ribs also have particularly large heights. Ribs face in the direction at right angles with a main flowing direction, and an internal mold portion corresponding to a rib end constitutes a closed space in many cases. For these reasons, it is difficult in many cases to fully charge a resin composition so as to form a rib end portion. That is, a molten resin fails to flow so as to reach a portion corresponding to a rib end during injection molding, and defects such as a charging failure, gas burns, defective transfer, etc., are liable to occur, so that it is frequently demanded to decrease these defects. For a resin composition suitable for a molded product having a small wall thickness, it is also demanded in many cases to satisfy the above properties. That is, there is strongly desired a flame-retardant resin composition that is excellent in flame retardancy, particularly flame retardancy of a molded product having a small wall thickness, which is excellent in impact resistance and further which is suitable for a molded product having a thin wall portion such as ribs.

In the use of an organic phosphoric ester as a flame retardant, it is one of important subjects to improve the hydrolysis resistance thereof. With regard to the above improvement in hydrolysis resistance, various proposals have been made as will be explained below.

For example, JP-A-6-80885 describes a resin composition containing a thermoplastic resin and an organic phosphorus compound having a hydrolysis degree of a predetermined value or less under MIL-H19475 conditions, and it describes to the effect that the above composition is excellent in hydrolysis resistance. Further, the above laid-opening publication describes that a resin molded article containing an organic phosphorus compound is deteriorated in hydrolysis properties depending upon the hydrolysis properties of the organic phosphorus compound. It is particularly described that resorcinol phosphate is poor in hydrolysis. That is, hydrolysis resistance based on the structure of an organic phosphorus compound is disclosed. Data shown in Examples of the above laid-opening publication with regard to a component containing a phenolic hydroxyl group suggests that the presence or absence of such a component has an effect on the water resistance of a resin component.

JP-A-7-53876 describes that a resin composition containing bisphenol A polycresyl phosphate and an aromatic polycarbonate resin has excellent hydrolysis resistance over a resin composition containing a resorcinol polyphenyl phosphate and an aromatic polycarbonate resin. That is, the above laid-opening publication also teaches improvements of hydrolysis resistance based on the structure of an organic phosphorus compound.

JP-A-8-67685 describes a method of treating specific crude phosphoric esters without describing any specific resin composition. However, it is described that a phosphoric ester obtained by the above method not only has a low acid value but also contains remarkably less residual alkali metals or incompletely esterified compounds that cause the hydrolysis of the phosphoric ester. That is, the above laid-opening publication discloses that residual alkali metals, etc., in an organic phosphoric ester cause the hydrolysis of a phosphoric ester.

JP-A-10-168227 describes a phosphoric ester having an acid value of less than 1 and having a weight increase ratio of 20% or less under specific heat and humidity conditions and a heat weight loss of 5% or less at 300° C. and a resin composition containing the phosphoric ester. More specifically, it describes a resin composition containing a phosphoric ester having an acid value of 0.1, an aromatic polycarbonate resin and an ABS resin, and it is described that the resin composition has excellent durability against hot water. That is, the above laid-opening publication suggests that factors such as an acid value have an influence on the durability against hot water.

Further, with regard to an influence of an acid value, JP-A-11-310695 describes a flame-retardant resin composition containing an aromatic polycarbonate resin and an organic phosphoric ester having an acid value of less than about 1.0 mgKOH, and this laid-opening publication asserts that the above resin composition has excellent hydrolysis resistance. However, the excellent hydrolysis resistance in the above laid-opening publication is approximately equivalent to that of a resorcinol polyphenyl phosphate on a specific basis, and further, the above laid-opening publication fails to specifically disclose any behaviors found when an organic phosphoric ester other than the above-defined ones is used, so that the laid-opening publication cannot be said to make clear any influence of the acid value on hydrolysis resistance.

On the other hand, JP-A-11-130954 describes that a resin composition containing a polycarbonate resin, an ABS resin having a specific alkali metal content and a phosphoric ester compound having an acid value of 1 or less has excellent hydrolysis resistance. The above laid-opening publication refers to an effect of the acid value on the hydrolysis resistance of the resin composition. That is, it describes to the effect that with a decrease in the acid value, the resin composition is more improved in hydrolysis resistance.

Further, JP-A-11-315200 describes a flame-retardant resin composition containing an aromatic polycarbonate resin, a vinyl aromatic graft copolymer, an organic phosphoric ester compound and a basic metal oxide and having improved hydrolysis resistance. However, the above laid-opening publication discloses nothing but an effect of a basic metal oxide on improvement in hydrolysis.

JP-A-8-12811 describes a flame-retardant resin composition containing a thermoplastic resin, a specific phosphoric ester compound and a specific phosphoric ester compound having a phenolic hydroxyl group. While it is described that the above resin composition is excellent in adhesion of a coating and has excellent properties with respect to an appearance change after a test of immersion in hot water, the hydrolysis resistance thereof cannot be said to be satisfactory.

Further, JP-A-2001-151787 discloses a method of producing a specific phosphoric ester compound in which the content of diphenyl-p-isopropenylphenyl phosphate can be remarkably decreased. Further, the above laid-opening publication also describes that the content of a specific monophosphoric ester compound having a phenolic hydroxyl group, called "half component", decreases in a product obtained by the above method.

On the other hand, a titanium dioxide pigment is widely used as a colorant in resin compositions. The titanium dioxide colorant includes a wide variety of types thereof depending upon various ends and uses. JP-B-59-37304 discloses a titanium dioxide colorant whose particle surface is coated with less than 0.5% of $Al_2O_3$ and less than 1.5% of a polyhydric alcohol compound, and it is disclosed that such a titanium dioxide pigment is excellent in dispersibility and masking capability. JP-A-11-60743 discloses a resin composition containing engineering plastic and a titanium dioxide pigment that is surface-treated with 0.1 to 2% by weight of $Al_2O_3$, and it describes an effect that the occurrence of silver streaks is suppressed. Further, JP-A-9-176471 and JP-A-2000-169686 disclose resin compositions containing an aromatic polycarbonate resin, a phosphoric ester and titanium dioxide. Further, Japanese language publication No. 2002-528588 of PCT application describes a resin composition containing a polycarbonate resin, an ABS resin, titanium dioxide having one coating and an organic phosphate flame retardant, and it is described that the resin composition is improved in resistance against streaks. Further, WO01/72900 describes a resin composition containing a polycarbonate resin, an ABS resin, titanium dioxide and an organic phosphate flame retardant. However, no effect produced by a specific organic phosphate flame retardant is known. However, the above publications do not disclose any improvements in hydrolysis resistance, nor do they disclose any correlation between a titanium dioxide pigment and hydrolysis resistance.

Problems to be Solved by the Invention

It is a first object of the present invention to provide a flame-retardant resin composition which contains an aromatic polycarbonate resin or a polyphenylene ether resin as a main resin component, which is excellent in flame retardancy, particularly in flame retardancy as a product having a small wall thickness, and which has excellent impact resistance.

It is a second object of the present invention to provide a flame-retardant resin composition which contains an aromatic polycarbonate resin or a polyphenylene ether resin as a main resin component, and which is free of a mold pollution problem and excellent in hydrolysis resistance.

It is a third object of the present invention to provide a flame-retardant resin composition containing an aromatic polycarbonate resin or a polyphenylene ether resin as a main resin component and containing a titanium dioxide pigment as a colorant component, which resin composition is excellent in both flame retardancy and hydrolysis resistance.

Means to Solve the Problems

According to the present invention, it has been found that the above objects of the present invention can be achieved by incorporating, as a flame retardant, a phosphoric ester having a specific structure and having a predetermined polymerization degree.

According to the present invention, there is therefore provided a flame-retardant resin composition comprising (A) (1) a resin component (Component A-1) containing 50 to 100% by weight of an aromatic polycarbonate resin and 0 to 50% by weight of a styrene-containing resin or (2) a resin component (Component A-2) containing 20 to 80% by weight of a polyphenylene ether resin and 80 to 20% by weight of a polystyrene, provided that Component A-1 or Component A-2 will be referred to as Component A, and (B) a flame retardant (Component B) that is a phosphoric ester of the following formula (I), the phosphoric ester containing, per 100% by weight thereof, 3% by weight or less of a component having a condensation degree n of 0, 86.5 to 98.5% by weight of a component having a condensation degree n of 1, 1 to 9% by weight of a component having a condensation degree n of 2 and 1.5% by weight or less of a component having a condensation degree n of ≧3, and having a weight average condensation degree N in the range of 1.01 to 1.10 when the weight average condensation degree N is calculated without the component having a condensation degree n of 0, the flame-retardant resin composition containing, per 100% by weight of the total of Component A and Component B, 65 to 99% by weight of Component A and 1 to 35% by weight of Component B,

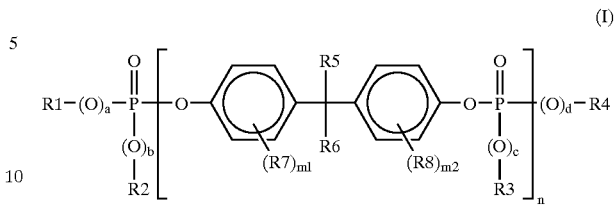

wherein each of R1, R2, R3 and R4 is independently an aryl group having 6 to 12 carbon atoms, each of R5 and R6 is independently methyl or a hydrogen atom, each of R7 and R8 is methyl, m1 and m2 are 0 or integers of 1 or 2, each of a, b, c and d is independently 0 or 1, and n is 0 or an integer of 1 to 5.

The flame-retardant resin composition of the present invention is classified into the following flame-retardant resin composition (I) or (II) depending upon whether the main resin component is an aromatic polycarbonate resin or a polyphenylene ether resin.

(1) Flame-Retardant Resin Composition (I):

Flame-retardant resin composition (I) comprising (A) a resin component (Component A-1) containing 50 to 100% by weight of an aromatic polycarbonate resin and 0 to 50% by weight of a styrene-containing resin, and (B) a flame retardant (Component B) that is a phosphoric ester of the above formula (I), the phosphoric ester containing, per 100% by weight thereof, 3% by weight or less of a component having a condensation degree n of 0, 86.5 to 98.5% by weight of a component having a condensation degree n of 1, 1 to 9% by weight of a component having a condensation degree n of 2 and 1.5% by weight or less of a component having a condensation degree n of ≧3, and having a weight average condensation degree N in the range of 1.01 to 1.10 when the weight average condensation degree N is calculated without the component having a condensation degree n of 0, the flame-retardant resin composition containing, per 100% by weight of the total of Component A-1 and Component B, 65 to 99% by weight of Component A-1 and 1 to 35% by weight of Component B.

(2) Flame-Retardant Resin Composition (II):

Flame-retardant resin composition (II) comprising (A) a resin component (Component A-2) containing 20 to 80% by weight of a polyphenylene ether resin and 80 to 20% by weight of a polystyrene, and (B) a flame retardant (Component B) that is a phosphoric ester of the above formula (I), the phosphoric ester containing, per 100% by weight thereof, 3% by weight or less of a component having a condensation degree n of 0, 86.5 to 98.5% by weight of a component having a condensation degree n of 1, 1 to 9% by weight of a component having a condensation degree n of 2 and 1.5% by weight or less of a component having a condensation degree n of ≧3, and having a weight average condensation degree N in the range of 1.01 to 1.10 when the weight average condensation degree N is calculated without the component having a condensation degree n of 0, the flame-retardant resin composition containing, per 100% by weight of the total of Component A-2 and Component B, 65 to 99% by weight of Component A-2 and 1 to 35% by weight of Component B.

The flame-retardant resin compositions (I) and (II) of the present invention will be explained further in detail below.

First, the phosphoric ester as a flame retardant component (Component B) common to the resin compositions (I) and (II) will be explained.

In the present invention, the phosphoric ester as a flame retardant component (Component B) is represented by the following formula (I).

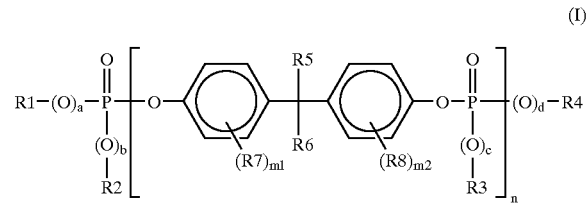

wherein each of R1, R2, R3 and R4 is independently an aryl group having 6 to 12 carbon atoms, each of R5 and R6 is independently methyl or a hydrogen atom, each of R7 and R8 is methyl, m1 and m2 are 0 or integers of 1 or 2, each of a, b, c and d is independently 0 or 1, and n is 0 or an integer of 1 to 5.

In the above formula (I), the aryl group that each of R1 to R4 represents refers to a residue remaining after removal of one hydrogen atom from a benzene ring of an aromatic compound, and it is preferably a residue obtained by removing one hydrogen atom from a benzene ring of an aromatic hydrocarbon. Examples of the aryl group include phenyl, tolyl, xylyl, biphenylyl and naphthyl.

The phosphoric ester is preferably a phosphoric ester of the above formula (I) in which each of m1 and m2 is 0, each of a, b, c and d is 1, each of R1, R2, R3 and R4 is phenyl, and each of R5 and R6 is methyl. The above phosphoric ester containing bisphenol A bis(diphenylphosphate) as a main component has a high phosphorus content, so that a resin composition containing such a phosphoric ester has excellent flame retardancy and exhibits excellent flowability during molding. Further, the above phosphoric ester has excellent hydrolysis resistance, so that a resin composition containing such a phosphoric ester is excellent in the capability of keeping good qualities for a long period of time.

Further, Component B in the present invention is the phosphoric ester of the above formula (I), which phosphoric ester contains, per 100% by weight thereof, 3% by weight or less of a component having a condensation degree n of 0, 86.5 to 98.5% by weight of a component having a condensation degree n of 1, 1 to 9% by weight of a component having a condensation degree n of 2 and 1.5% by weight or less of a component having a condensation degree n of ≧3, and has a weight average condensation degree N in the range of 1.01 to 1.10 when the weight average condensation degree N is calculated without the component having a condensation degree n of 0.

Preferably, Component B is the phosphoric ester of the above formula (I), which phosphoric ester contains, per 100% by weight thereof, 2.5% by weight or less of a component having a condensation degree n of 0, 89.5 to 98.5% by weight of a component having a condensation degree n of 1, 1 to 7% by weight of a component having a condensation degree n of 2 and 1% by weight or less of a component having a condensation degree n of ≧3. More preferably, Component B is the phosphoric ester of the above formula (I), which phosphoric ester contains, per 100% by weight thereof, 0.5 to 2% by weight of a component-having a condensation degree n of 0, 91.5 to 98.5% by weight of a component having a condensation degree n of 1, 1 to 6% by weight of a component having a condensation degree n of 2 and 0.5% by weight or less of a component having a condensation degree n of ≧3. Further, particularly preferably, Component B is the phosphoric ester of the above formula (I), which phosphoric ester contains, per 100% by weight thereof, 0.5 to 1.5% by weight of a component having a condensation degree n of 0, 94 to 98.5% by weight of a component having a condensation degree n of 1, 1 to 4% by weight of a component having a condensation degree n of 2 and 0.5% by weight or less of a component having a condensation degree n of ≧3.

The weight average condensation degree N that is calculated without the component having a condensation degree n of 0 is preferably 1.01 to 1.09, more preferably 1.01 to 1.07, particularly preferably 1.01 to 1.05.

The above Component B is advantageous for molding the resin composition to produce a product having a small wall thickness. Further, the content of a component having a condensation degree n of 0 in Component B is only required to be 3% by weight or less, preferably 2.5% by weight or less, and there is not required any step of completely removing the component having a condensation degree n of 0. The above Component B is therefore also advantageous from the viewpoint of efficiency of industrial production of the phosphoric ester. The above Component B is advantageous for decreasing an appearance defect in molding the resin composition containing the above Component B to produce a product having a small wall thickness, particularly, more advantageous for producing a product having ribs, as compared with a case where the content of a component having a condensation degree n of 0 exceeds 3% by weight. The above advantage comes to be more remarkable in an injection molded article having t1, t2 and h that satisfy $0.8 \leq t1 \leq 2.5$ (mm) (preferably $1.0 \leq t1 \leq 2.0$ (mm)), $0.4 \leq t2 \leq 2.0$ (mm) (preferably $0.5 \leq t2 \leq 1.8$ (mm)) and $10 \leq h \leq 50$ (mm) in which $t_1$ is a thickness of base portion of a rib, t2 is a thickness of end portion of the rib and h is a height of the rib.

The above Component B is advantageous in view of the impact resistance and flame retardancy of the resin composition containing the Component B as compared with a case where the content of a component having a condensation degree n of 1 is less than 86.5% by weight or the content of a component having a condensation degree n of 2 is over 9% by weight. The above Component B is industrially advantageous as compared with a case where the content of a component having a condensation degree n of 1 is over 98.5% by weight or the content of a component having a condensation degree n of 2 is less than 1% by weight, since the number of steps for phosphoric ester purification can be decreased and since the time period for the steps can be decreased. The above Component B is advantageous in view of impact resistance and flame retardancy as compared with a case where the content of a component having a condensation degree n of ≧3 is over 1.5% by weight.

Further, the above Component B is industrially advantageous as compared with a phosphoric ester having a weight average condensation degree N of less than 1.01, since the number of steps for phosphoric ester purification can be decreased. It is advantageous in impact resistance and flame retardancy as compared with a phosphoric ester having a weight average condensation degree N of over 1.10.

The flame-retardant resin composition of the present invention comprises a resin component as Component A and the above Component B. The form of Component B as a raw material is therefore not specifically limited so long as Component B satisfies the above conditions of Component B. Since, however, it is industrially disadvantageous to synthesize or purify each of components having a condensation degree n of 1 to 5 in the formula (I) at high purities as described above, it is preferred to mix a mixture satisfying the component contents of Component B with a resin component (Component A) to prepare a resin composition. Further, two or more phosphoric esters having different contents of components with condensation degrees n or having different weight average condensation degrees N can be mixed such that the mixture satisfies the conditions of Component B.

In the present invention, the phosphoric ester as a flame retardant (Component B) preferably has an acid value of 0.2 mgKOH/g or less, and the acid value is more preferably 0.15 mgKOH/g or less, particularly preferably 0.1 mgKOH/g or less, the most preferably 0.05 mgKOH/g or less. While the lower limit of the acid value can be substantially zero, the acid value is preferably 0.01 mgKOH/g or more from the viewpoint of production. When the acid value of the phosphoric ester exceeds 0.2 mgKOH/g, the hydrolysis resistance of the resin composition tends to decrease.

In the present invention, desirably, the content of a phosphoric ester of the following formula (II) (to be abbreviated as "half ester" hereinafter) derived from the production thereof in the phosphoric ester as a flame retardant (Component B) is 1.5% by weight or less.

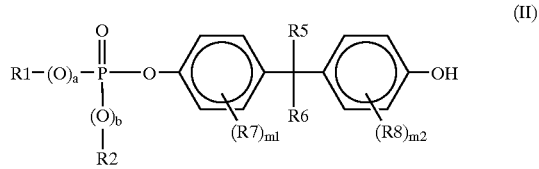
(II)

wherein R1, R2, R5, R6, R7, R8, a, b, m1 and m2 are as defined in the above formula (I).

The half ester of the above formula (II) is an intermediate formed in the process of producing the phosphoric ester of the above formula (I), and the smaller the content thereof is, the more preferred it is. The content of the half ester is more preferably 1.1% by weight or less, particularly preferably 0.9% by weight or less. In practical use, the lower limit of the content thereof is 0.1% by weight. When the content of the half ester exceeds 1.5% by weight, it is sometimes observed that the hydrolysis resistance of the resin composition decreases.

The method for producing the phosphoric ester satisfying Component B is preferably the following method. That is, preferred is a phosphoric ester obtained by a method (i) in which a dihydric phenol and phosphorus oxyhalide are reacted and then a monohydric phenol is reacted. In the above method, first, a dihydric phenol (to be sometimes referred to as "raw material (a)" hereinafter) such as bisphenol A for constituting the main chain component of the above formula (I) and a phosphorus oxyhalide (to be sometimes referred to as "raw material (b)" hereinafter) such as phosphorus oxychloride are reacted in the presence of a Lewis acid catalyst, to obtain an intermediate. In the above reaction, the catalyst includes aluminum chloride, magnesium chloride, titanium tetrachloride, antimony pentachloride, iron chloride, zinc chloride and tin chloride. Aluminum chloride and magnesium chloride are more preferred, and magnesium chloride is particularly preferred.

The raw material (a):raw material (b) amount ratio by molar ratio is generally 1:2 to 1:10, preferably 1:3 to 1:6, more preferably 1:3.5 to 1:4.5. With an increase in the amount of the raw material (b), the amount of components having condensation degrees n of 2 and n>2 decreases.

However, the yield of a product based on the total raw material amount decreases, so that it is proper to determine the above amount ratio in the preferred range above. Further, there can be employed any one of a method in which the raw material (a) and the raw material (b) are mixed in advance and then reacted and a method in which one of the materials is charged in a reactor and the other is dropwise added thereto to carry out the reaction.

Further, the reaction temperature in the reaction for obtaining the above intermediate is preferably 80 to 130° C., more preferably 100 to 120° C. While the reaction is generally carried out in the absence of a solvent, a solvent such as toluene, xylene, dichlorobenzene, hexane or heptane can be used as required. The time period for the reaction is generally 3 to 20 hours, more preferably 3 to 12 hours, still more preferably 5 to 8 hours. Further, generally, an atmosphere having atmospheric pressure is employed as an atmosphere in the reaction system (the pressure in the system is sometimes reduced at the later stage of the reaction). For preventing oxidation, the reaction is preferably carried out in a deoxidized atmosphere, and it is more preferably carried out in a nitrogen gas atmosphere.

After the reaction for forming the above intermediate, the reaction system is pressure-reduced thereby to remove unreacted phosphorus oxyhalide. The temperature for the above removal is preferably 100 to 200° C., more preferably 120 to 180° C., still more preferably 130 to 170° C. The reduced pressure is preferably in the range of 0.1 to 40 kPa, more preferably in the range of 5 to 30 kPa. When the reduced pressure is in the above range, the phosphoric ester as Component B in the present invention can be efficiently produced.

A monohydric phenol (to be sometimes referred to as "raw material (c)" hereinafter) such as phenol for constituting side-chain components (R1 to R4) of the above formula (I) is added to the intermediate obtained by the above procedures, followed by a reaction, and a crude phosphoric ester is obtained. As a catalyst for the above reaction, it is efficient to use the catalyst used for the synthesis of the above intermediate as it is, while a catalyst can be newly added. The raw material (a): raw material (c) amount ratio by molar ratio is preferably in the range of 1:4 to 1:4.5, more preferably in the range of 1:4 to 1:4.2, still more preferably in the range of 1:4 to 1:4.05. When the above monohydric phenol is added, it is preferred to employ a method of gradually adding it, such as a method of adding it dropwise to the reaction system.

Concerning the reaction temperature for the reaction carried out for obtaining the crude phosphoric ester, preferably, the monohydric phenol is dropwise added at a temperature of 80 to 120° C., and then, the reaction is carried out at a temperature of at least 120° C., preferably 130 to 160° C. The time period for the reaction at 120° C. or lower is 1 to 6 hours, preferably 1.5 to 4 hours, and the time period to be taken after dropwise adding of the monohydric phenol and before the temperature is increased to 120° C. or higher is 1 to 6 hours, preferably 1.5 to 4 hours. After the temperature is increased, the reaction is carried out for a predetermined period of time, preferably for 0.5 to 3 hours. Like the reaction for obtaining the above intermediate, a nitrogen gas atmosphere is preferred as an atmosphere in the system. At a later stage of the reaction, preferably, the pressure in the system is kept reduced for promoting a dehydrohalogenation and removing hydrogen halide remaining in the system. The reduced pressure above is preferably 5 kPa or lower, more preferably in the range of 0.1 to 2 kPa.

After completion of the above reaction, the crude phosphoric ester can be purified by the following procedures, and it is more preferred to purify the crude phosphoric ester. That is, first, the obtained crude phosphoric ester is washed with an acidic aqueous solution of hydrochloric acid, phosphoric acid and the like or an organic acid such as oxalic acid to remove the catalyst. Preferably, the above washing is carried out repeatedly several times with water. Further, impurities are removed by washing with water, washing with hot water or alkali neutralization. Alternatively, impurities are brought into a state where they can be removed, by adding an epoxy compound, and then the impurities are removed by washing with water, and the like. By these procedures, the acid value is decreased. For decreasing the acid value, it is particularly effective to carry out the washing with water after treatment with an epoxy compound such as propylene oxide. The use of the above epoxy compound is preferred since the acid value and metals can be efficiently decreased. JP-A-8-67685 describes particulars of the above method.

The reactivity of the entire system is decreased by removing the catalyst and impurities are removed, as described above, and then the pressure in the system is reduced to remove water, the solvent, unreacted monohydric phenol, and the like. The above method is preferred since by-products can be decreased, and the above point is disclosed in JP-A-2001-151787.

Preferably, the thus-obtained phosphoric ester is further purified. That is, for obtaining the phosphoric ester satisfying Component B of the present invention, it is more preferred to treat the above phosphoric ester according to recrystallization treatment using a solvent such as isopropanol or the like. Generally, the above phosphoric ester is obtained in the form of a viscous liquid. Such a liquid and a solvent such as isopropanol or the like are homogeneously mixed at high temperatures, then, the mixture is cooled, and a separated phosphoric ester is collected. While the solvent for the above treatment can be selected as required, an alcohol is preferred, and isopropanol is particularly preferred. With the above treatment, Component B preferred in the present invention can be obtained easily without impairing production efficiency much.

In addition to the above, the method of preparing a phosphoric ester includes, for example, a method (ii) in which a phenol and phosphorus oxyhalide are reacted to form diphenylphosphorohalidate, and a dihydric phenol is further reacted. As described already, the above method is effective for a specific monohydric phenol such as 2,6-dialkyl-substituted phenol, but the method cannot be said to be effective when a phenol is used, since the purity of diphenylphosphorohalidate decreases. Therefore, for producing the phosphoric ester containing bisphenol A bis (diphenylphosphate) as a main component, which is a preferred embodiment as Component B in the present invention, the above method (i) is more advantageous.

In the present invention, further, a phosphoric ester having an alkali (alkaline earth) metal content of less than 500 ppm is preferred as a phosphoric ester that is Component B. The above content is preferably less than 300 ppm, more preferably, less than 100 ppm. The content of alkali (alkaline earth) metals in the phosphoric ester flame retardant can be decreased by a method in which a phosphoric ester that is treated by the above various methods, particularly by the above treatment with an epoxy compound, is washed with water. The alkali (alkaline earth) metals remaining in the phosphoric ester flame retardant include magnesium mainly from the catalyst, and alkali and alkaline earth metals from an aqueous solution containing ions of sodium, potassium and calcium which are used for washing.

With regard to the flame-retardant resin composition (I) of the present invention, components other than the above Component B as a flame retardant component and a composition of the components will be explained below. As described already, the resin composition (I) comprises a resin component (Component A-1) containing, per 100% by weight of the resin component, 50 to 100% by weight of an aromatic polycarbonate resin and 0 to 50% by weight of a styrene-containing resin.

The aromatic polycarbonate resin of the Component A-1 is obtained by reacting a dihydric phenol and a carbonate precursor. The method for the reaction includes an interfacial polycondensation method, a melt ester-exchange method, a method of solid phase ester-exchange of a carbonate prepolymer and a method of ring-opening polymerization of a cyclic carbonate compound.

Typical examples of the dihydric phenol include 2,2-bis (4-hydroxyphenyl)propane (generally called bisphenol A), 2,2-bis{(4-hydroxy-3-methyl)phenyl}propane, 2,2-bis(4-hydroxyphenyl)butane, 2,2-bis(4-hydroxyphenyl)3-methylbutane, 9,9-bis{(4-hydroxy-3-methyl)phenyl}fluorene, 2,2-bis(4-hydroxyphenyl)-3,3-dimethylbutane, 2,2-bis(4-hydroxyphenyl)-4-methylpentane, 1,1-bis(4-hydroxyphenyl)-3,3,5-trimethylcyclohexane and α,α'-bis(4-hydroxyphenyl)-m-diisopropylbenzene. In addition to these, dihydric aliphatic alcohols such as 1,4-cyclohexanedimethanol may be copolymerized. Of aromatic polycarbonates obtained from the various dihydric phenols above, a homopolymer of bisphenol A is particularly preferred. The above aromatic polycarbonate are preferred since the resin composition therefrom has excellent impact resistance.

The carbonate precursor is selected from carbonyl halide, carbonate ester or haloformate, and specifically, it includes phosgene, diphenyl carbonate and dihaloformate of a dihydric phenol.

When a polycarbonate resin is prepared by an interfacial polymerization method using the above dihydric phenol and carbonate precursor, there may be used a catalyst, a terminal stopper and an antioxidant for preventing oxidation of the dihydric phenol, as required. Further, the polycarbonate resin in the present invention includes a branched polycarbonate resin obtained by copolymerization of a trifunctional or higher polyfunctional aromatic compound, a polyester carbonate resin obtained by copolymerization of an aromatic or aliphatic (including "alicyclic") difunctional carboxylic acid, a copolycarbonate resin obtained by copolymerization of a dihydric alcohol (including an aliphatic alcohol) and a polyester carbonate resin obtained by copolymerization of both of the above difunctional carboxylic acid and a dihydric alcohol. The polycarbonate resin may be a mixture of two or more polycarbonate resins obtained. The trifunctional or higher polyfunctional aromatic compound can be selected from 1,1,1-tris(4-hdyroxyphenyl)ethane, 1,1,1-tris(3,5-dimethyl-4-hydroxyphenyl)ethane.

When a polyfunctional compound that generates a branched polycarbonate is contained, desirably, the amount ratio of such a compound to the total amount of the aromatic polycarbonate is 0.001 to 1 mol %, preferably 0.005 to 0.9 mol %, particularly preferably 0.01 to 0.8 mol %. In a melt ester-exchange method in particular, a branched structure is sometimes formed as a side reaction. Desirably, the amount ratio of such a branched structure to the total amount of the aromatic polycarbonate is also 0.001 to 1 mol %, preferably 0.005 to 0.9 mol %, particularly preferably 0.01 to 0.8 mol %. The above amount ratio can be calculated on the basis of $^1$H-NMR measurement.

Further, the aromatic polycarbonate resin may be a polyester carbonate obtained by copolymerization of an aromatic or aliphatic difunctional carboxylic acid. Examples of the aliphatic difunctional carboxylic acid include aliphatic difunctional carboxylic acids having 8 to 20 carbon atoms, preferably 10 to 12 carbon atoms. The above aliphatic difunctional carboxylic acid may be any one of linear, branched and cyclic aliphatic difunctional carboxylic acids. The aliphatic difunctional carboxylic acid is preferably α,ω-dicarboxylic acid. Examples of the aliphatic difunctional carboxylic acid include linear saturated aliphatic dicarboxylic acids such as sebacic acid (decanedioic acid), dodecanedioic acid, tetradecanedioic acid, octadecanedioic acid and icosanedioic acid, and alicyclic dicarboxylic acids such as cyclohexanedicarboxylic acid. An alicyclic diols is more preferred as a dihydric alcohol, and examples thereof include cyclohexanedimethanol, cyclohexanediol and tricyclodecanedimethanol.

Further, a polycarbonate-polyorganosiloxane copolymer obtained by copolymerization of a polyorganosiloxane unit can be also used.

The aromatic polycarbonate may be a mixture of two or more aromatic polycarbonates such as various polycarbonates having different dihydric phenols, a branched polycarbonate having a branching component, various polyester carbonates, a polycarbonate-polyorganosiloxane copolymer, and the like. Further, aromatic polycarbonates formed by different production methods shown below and aromatic polycarbonates formed by using different terminal stoppers can be also used as a mixture of two or more of them.

In the polymerization for the aromatic polycarbonate, the reaction by an interfacial polycondensation method is generally a reaction between a dihydric phenol and phosgene, and these are reacted in the presence of an acid binder and an organic solvent. The acid binder is selected, for example, from alkali metal hydroxides such as sodium hydroxide and potassium hydroxide or amine compounds such as pyridine. The organic solvent is selected, for example, from halogenated hydrocarbons such as methylene chloride and chlorobenzene. For promoting the reaction, further, there may be used a catalyst that is selected from tertiary amine, a quaternary ammonium compound or a quaternary phosphonium compound such as triethylamine, tetra-n-butylammonium bromide or tetra-n-butylphosphonium bromide. Preferably, the temperature for the above reaction is generally 0 to 40° C., the time period for the reaction is approximately 10 minutes to 5 hours, and the pH during the reaction is maintained at 9 or more.

In the above polymerization, generally, a terminal stopper is used. The terminal stopper can be selected from monohydric phenols. Specific examples of the monohydric phenols include phenol, p-tert-butylphenol, p-cumylphenol and isooctylphenol. Further, the monohydric phenols include decylphenol, dodecylphenol, tetradecylphenol, hexadecylphenol, octadecylphenol, eicosylphenol, docosylphenol and triacontylphenol. The above terminal stoppers may be used alone or in combination.

The reaction by the melt ester-exchange reaction is generally an ester-exchange reaction between a dihydric phenol and a carbonate ester, and the reaction is carried out according to a method in which the dihydric phenol and the carbonate ester are mixed while these are heated in the presence of an inert gas, and a formed alcohol or phenol is distilled off. Differing depending upon the boiling point, etc., of the formed alcohol or phenol, the temperature for the reaction is in the range of 120 to 350° C. At a later stage of the reaction, the pressure in the system is reduced to approximately $1.33 \times 10^3$ to 13.3 Pa to easily distill off the formed alcohol or phenol. The time period for the reaction is generally approximately 1 to 4 hours.

The carbonate ester includes esters of an optionally substituted aryl group or an aralkyl group having 6 to 10 carbon atoms or an alkyl group having 1 to 4 carbon atoms, and of these, diphenyl carbonate is preferred.

Further, a polymerization catalyst may be used for promoting the polymerization rate. The polymerization catalyst can be selected, for example, from alkali metal compounds such as sodium hydroxide, potassium hydroxide and a sodium or potassium salt of dihydric phenol, alkaline earth metal compounds such as calcium hydroxide, barium hydroxide and magnesium hydroxide, or nitrogen-containing basic compounds such as tetramethylammonium hydroxide, tetraethylammonium hydroxide, trimethylamine and triethylamine. Further, the polymerization catalyst can be selected from those catalysts which are used for general esterifications or ester-exchange reactions, such as alkoxides of alkali (alkaline earth) metals, organic acid salts of alkali (alkaline earth) metals, boron compounds, germanium compounds, antimony compounds, titanium compounds or zirconium compounds. These catalysts may be used alone or in combination of two or more of these compounds. The amount of the polymerization catalyst per mole of the dihydric phenol as a raw material is preferably $1 \times 10^{-8}$ to $1 \times 10^{-3}$ equivalent weight, more preferably $1 \times 10^{-7}$ to $5 \times 10^{-4}$ equivalent weight.

In the reaction by the melt ester-exchange method, a compound such as 2-chlorophenylphenyl carbonate, 2-methoxycarbonylphenylphenyl carbonate and 2-ethoxycarbonylphenylphenyl carbonate or the like may be added at a later stage, or after completion, of the polycondensation for decreasing phenolic terminal groups.

In the melt ester-exchange method, it is preferred to use a deactivator for neutralizing the activity of the catalyst. Preferably, the deactivator is used in an amount of 0.5 to 50 mol per mole of a remaining catalyst. Further, 0.01 to 500 ppm, preferably 0.01 to 300 ppm, particularly preferably 0.01 to 100 ppm of a deactivator is added to the aromatic polycarbonate after the polymerization. The deactivator preferably includes phosphonium salts such as tetrabutylphosphonium dodecylbenzenesulfonate and ammonium salts such as tetraethylammonium dodecylbenzylsalfate.

Although not specially limited, the viscosity average molecular weight of the aromatic polycarbonate resin is preferably in the range of 15,000 to 100,000. The above viscosity average molecular weight is more preferably 17,000 to 30,000, still more preferably 18,000 to 30,000, particularly preferably 19,000 to 30,000. In this case, an aromatic polycarbonate resin having a viscosity average molecular weight outside the above range may be used as part of a mixture.

Particularly, a mixture containing an aromatic polycarbonate resin having a viscosity average molecular weight of over 50,000 has a high entropy elasticity and has a characteristic feature that a molded article thereof is less likely to have an appearance defect caused by Theological behaviors typified by jetting. When such an appearance defect takes place, the above embodiment is suitable. Further, the above mixture is also advantageous since the gas injection amount is stabilized in gas injection molding, and since an expansion cell is stabilized in expansion molding so that a fine and uniform cell can be easily formed.

A mixture containing a polycarbonate resin having a viscosity average molecular weight of over 80,000 is more preferred, and a mixture containing a polycarbonate resin having a viscosity average molecular weight of over 100,000 is still more preferred. That is, a mixture having a molecular weight distribution having two or more peaks in a measurement method such as GPC (gel permeation chromatography) can be preferably used. Even when the flame-retardant resin composition (I) of the present invention contains, as Component A-1, an aromatic polycarbonate having a relatively high viscosity average molecular weight of at least 25,000, preferably 25,000 to 30,000, it has good flowability so as to form a rib end and makes it possible to obtain an excellent molded product having a small wall thickness. When various molding methods such as an ultra-high speed injection molding method are applied, further, there can be suitably obtained excellent molded products having a small wall thickness. When the viscosity average molecular weight of the aromatic polycarbonate is less than 15,000, the impact strength, flame retardancy, and the like are liable to decrease. When it exceeds 100,000, undesirably, the flowability decreases.

In the aromatic polycarbonate resin in the present invention, the phenolic hydroxyl group content thereof is preferably 30 eq/ton or less, more preferably 25 eq/ton or less, still more preferably 20 eq/ton or less. The above value can be substantially brought to 0 eq/ton by fully reacting a terminal stopper. When such a specific-aromatic polycarbonate resin is used, the resin composition is further improved in thermal stability and generation of volatile components during molding. The above phenolic hydroxyl group content can be determined by making $^1$H-NMR measurement, calculating a molar ratio of dihydric phenol units having a carbonate bond, dihydric phenol units having a phenolic hydroxyl group and units of a terminal stopper, and making a conversion to a phenolic hydroxyl group content per unit weight of a polymer on the basis of the thus-obtained data.

The viscosity average molecular weight M in the present invention is determined by calculating a specific viscosity of the following equation on the basis of measurements of a solution of 0.7 g of an aromatic polycarbonate resin in 100 ml of methylene chloride at 20° C. with an Ostwald viscometer, Specific viscosity $(\eta_{sp})=(t-t_0)/t_0$ wherein $t_0$ is a length of time by second for which methylene chloride drops and t is a length of time by second for which a sample solution drops, and inserting the obtained specific viscosity into the following equation.

$\eta_{sp}/c=[\eta]+0.45\times[\eta]^2 c$ (in which $[\eta]$ is an intrinsic viscosity $[\eta]=1.23\times10^{-4}M^{0.83}$ c=0.7

In the flame-retardant resin composition (I) of the present invention, the resin component (Component A-1) is the above aromatic polycarbonate resin alone or a resin mixture of such a resin with a specific amount of a styrene-containing resin. That is, when the content of the resin component (Component A-1) is 100% by weight as a resin component, the content of the aromatic polycarbonate resin is 50 to 100% by weight, and the content of the styrene-containing resin is 0 to 50% by weight. Preferably, the content of the aromatic polycarbonate resin is 70 to 95% by weight, and the content of the styrene-containing resin is 5 to 30% by weight. Particularly preferably, the content of the aromatic polycarbonate resin is 75 to 90% by weight, and the content of the styrene-containing resin is 10 to 25% by weight.

The styrene-containing resin used in the above resin component (Component A-1) will be explained below.

The styrene-containing resin in Component A-1 refers to a resin that is a polymer or copolymer of an aromatic vinyl compound, or a resin that is a copolymer obtained by copolymerization of an aromatic vinyl compound and at least one member selected from other vinyl monomer and a rubbery polymer. The content of the aromatic vinyl compound per 100% by weight of the resin is preferably at least 10% by weight. The content of the aromatic vinyl compound in the styrene-containing resin is more preferably at least 30% by weight, still more preferably 40 to 90% by weight, particularly preferably 50 to 80% by weight. The above content of the aromatic vinyl compound is a content thereof per 100% by weight of the entire styrene-containing resin, and when a mixture of a plurality of polymers is present as the styrene-containing resin, it is not required that all the polymers satisfy the above desirable condition. However, preferably, the content of the aromatic vinyl compound in any one of the polymers is at least 10% by weight.

The aromatic vinyl compound includes styrene, α-methylstyrene, o-methylstyrene, p-methylstyrene, vinylxylene, ethylstyrene, dimethylstyrene, p-tert-butylstyrene, vinylnaphthalene, methoxystyrene, monobromostyrene, dibromostyrene, fluorostyrene and tribromostyrene. Styrene is particularly preferred.

The other vinyl monomer copolymerizable with the aromatic vinyl compound preferably includes vinyl cyanide compounds and (meth)acrylic ester compounds. The vinyl cyanide compound includes acrylonitrile and methacrylonitrile, and acrylonitrile is particularly preferred.

The (meth)acrylic ester compound specifically includes methyl (meth)acrylate, ethyl (meth)acrylate, propyl (meth)acrylate, isopropyl (meth)acrylate, butyl (meth)acrylate, amyl (meth)acrylate, hexyl (meth)acrylate, octyl (meth)acrylate, 2-ethylhexyl (meth)acrylate, cyclohexyl (meth)acrylate, dodecyl (meth)acrylate, octadecyl (meth)acrylate, phenyl (meth)acrylate and benzyl (meth)acrylate. The above "(meth)acrylate" has a meaning that it includes both of methacrylate and acrylate, and the above "(meth)acrylic ester" has a meaning that it includes both of methacrylic ester and acrylic ester. The (meth)acrylic ester compound is particularly preferably methyl methacrylate.

The other vinyl monomer copolymerizable with the aromatic vinyl compound, other than the vinyl cyanide compound and the (meth)acrylic ester compound, includes epoxy-group-containing methacrylic esters such as glycidyl methacrylate, maleimide monomers such as maleimide, N-methylmaleimide and N-phenylmaleimide, and α,β-unsaturated carboxylic acids such as acrylic acid, methacrylic acid, maleic acid, anhydrous maleic acid, phthalic acid and itaconic acid, and anhydrides thereof.

The above rubbery polymer includes polybutadiene, polyisoprene, diene copolymers (such as styrene-butadiene random copolymer and block copolymer, an acrylonitrile-butadiene copolymer, an alkyl (meth)acrylate-butadiene copolymer, etc.), copolymers from ethylene and a-olefin (such as ethylene-propylene random copolymer and block copolymer, and ethylene-butene random copolymer and block copolymer, etc.), copolymers from ethylene and unsaturated carboxylic ester (such as an ethylene-methacrylate copolymer, an ethylene-butyl acrylate copolymer, etc.), copolymers from ethylene and aliphatic vinyl (such as an ethylene-vinyl acetate copolymer, etc.,), ethylene-propylene-non-conjugated diene terpolymers (such as an ethylene-propylene-hexadiene copolymer, etc.), acrylic rubbers (such as polybutyl acrylate, poly(2-ethylhexyl acrylate, a copolymer of butyl acrylate and 2-ethylhexyl acrylate, etc.), and silicone rubbers (such as polyorganosiloxane rubber, IPN rubber formed of a polyorganosiloxane rubber component and a polyalkyl (meth)acrylate rubber component; that is, a rubber having a structure in which the two rubber components are so intermingled with each other as not to be disintegrated, IPN rubber formed of a polyorganosiloxane rubber component and a polyisobutylene rubber component, etc.). Of these, polybutadiene, polyisoprene and a diene copolymer which easily exhibit their effect are preferred, and polybutadiene is particularly preferred. The content of the above rubbery polymer per 100% by weight of the styrene-containing resin is preferably 90% by weight or less, more preferably 80% by weight or less.

Specifically, the styrene-containing resin is, for example, at least one styrene-containing resin selected from the group consisting of a polystyrene resin (including a PS resin and an HIPS resin), an MS resin, an ABS resin, an AS resin, an AES resin, an ASA resin, an MBS resin, an MABS resin, an MAS resin, an SMA resin, an SBS resin and an SIS resin. The above SBS resin and SIS resin are resins that are called styrene-containing thermoplastic elastomers. The former is a (hydrogenated) styrene-butadiene-styrene copolymer, and the latter is a (hydrogenated) styrene-isoprene-styrene copolymer. The term "(hydrogenated)" means that such a copolymer includes both a copolymer that is not hydrogenated and a hydrogenated copolymer. Of these, rubber-reinforced styrene-containing resins such as HIPS, ABS, AES, ASA, MBS, MABS, MAS, SBS and SIS resins are preferred.

Of the above resins, an ABS resin is particularly preferred. The ABS resin has excellent moldability for forming a molded product having a small wall thickness and also has excellent impact resistance. When combined with the aromatic polycarbonate resin, it particularly serves to exhibit preferred properties. The above MS resin stands for a copolymer resin formed mainly from methyl methacrylate and styrene, the above AES resin stands for a copolymer resin formed mainly from acrylonitrile, ethylene-propylene rubber and styrene, the above ASA resin stands for a copolymer resin formed mainly from acrylonitrile, styrene and acrylic rubber, the above MABS resin stands for a copolymer resin formed mainly from methyl methacrylate, acrylonitrile, butadiene and styrene, the above MAS resin stands for a copolymer resin formed mainly from methyl methacrylate, acrylic rubber and styrene, and the above SMA resin stands for a copolymer resin formed mainly from styrene and maleic anhydride (MA).

The above styrene-containing resins may be used alone or in combination of at least two resins of these. For example, the ABS resin is generally a mixture of an AS polymer (acrylonitrile-styrene copolymer) with an ABS copolymer (copolymer in which acrylonitrile and styrene are grafted to polybutadiene rubber by copolymerization), and such a mixture can be suitably used in Component A-1.

Further, the styrene-containing resin may be a resin having high stereoregularity formed by catalysis of a metallocene catalyst, or the like during its preparation, such as syndiotactic polystyrene. In some cases, further, the styrene-containing resin may be any one of a polymer or copolymer having a narrow molecular weight distribution, a block copolymer and a polymer or copolymer having high stereoregularity, obtained by the method of anion living polymerization, radical living polymerization, or the like.

As far as the ABS resin is concerned, the content of a diene rubber component per 100% by weight of the ABS resin (that is, per 100% by weight of the total content of the ABS copolymer and AS copolymer) is preferably 5 to 80% by weight, more preferably 8 to 50% by weight, particularly preferably 10 to 30% by weight.

The vinyl cyanide compound for the ABS resin can be selected from those described above, and acrylonitrile is particularly preferred. Further, the aromatic vinyl compound can be similarly selected from those described above, and styrene and α-methylstyrene are preferred. The content of a component that is used for grafting to the diene rubber component per 100% by weight of the ABS resin component is preferably 95 to 20% by weight, more preferably 92 to 50% by weight. Further, per 100% by weight of the total content of the vinyl cyanide compound and the aromatic vinyl compound, preferably, the content of the vinyl cyanide compound is 5 to 50% by weight, and the content of the aromatic vinyl compound is 95 to 50% by weight. As part of the above component that is used to grafting to the diene rubber component, any one of methyl (meth)acrylate, ethyl acrylate, maleic anhydride and N-substituted maleimide may be used in combination with the above component, and the content of such a compound based on the ABS resin is preferably 15% by weight or less. Further, an initiator, a chain transfer agent, an emulsifier, etc., are used for the reaction as required, and can be selected from those that are conventionally known.

In the ABS resin, the rubber particle diameter thereof as a weight average particle diameter is preferably 0.05 to 5 μm, more preferably 0.1 to 1.5 μm, still more preferably 0.2 to 0.8 μm. Concerning the above rubber particle diameter, both a resin having a rubber particle diameter distribution having one peak and a resin having a rubber particle diameter distribution having two or more peaks can be used. Further, concerning morphology thereof, the ABS resin may be any one of a resin whose rubber particles have a single phase each and a resin having a salami structure formed by containing an occlusion phase around each of rubber particles.

It is conventionally well known that an ABS resin contains a copolymer of a vinyl cyanide compound and an aromatic vinyl compound which are not grafted to a diene rubber component. The ABS resin in Component A-1 in the present invention may contain a free polymer component generated during polymerization as described above, and may be a blend of vinyl compound polymers obtained by separately copolymerizing an aromatic vinyl compound and a vinyl cyanide compound. The above free copolymer (AS copolymer) of a vinyl cyanide compound and an aromatic vinyl compound has a reduced viscosity (30° C.), measured by the following method, of 0.2 to 1.0 dl/g, more preferably 0.3 to 0.7 dl/g.

The reduced viscosity is determined by accurately measuring 0.25 g of an AS copolymer, dissolving it in 50 ml of dimethylformamide over 2 hours to form a solution, and measuring the solution with an Ubbellohde viscometer in an environment at 30° C. The viscometer shows that the flow time period of a solvent is 20 to 100 seconds long. The reduced viscosity is calculated from a length of time by second ($t_0$) for which the solvent flows down and a length of time by second (t) for which the solution flows down on the basis of the following equation.

$$\text{Reduced viscosity } (\eta_{sp}/C) = \{(t/t_0) - 1\}/0.5$$

Concerning the content of the above free AS copolymer, an ABS resin is dissolved in a good solvent to the AS copolymer, such as acetone, the AS resin can be collected from a component soluble therein, and its content can be determined. On the other hand, a insoluble content (gel) constitutes a net ABS copolymer.

In the ABS copolymer, the content of the vinyl cyanide compound and aromatic vinyl compound grafted to the diene rubber component (ratio of weight of the graft component to the weight of the diene rubber component), i.e., the graft ratio (% by weight), is preferably 20 to 200%, more preferably 20 to 80%.

The above ABS resin may be a resin produced by any one of bulk polymerization, suspension polymerization and emulsion polymerization methods. More preferably, the ABS resin is an ABS resin produced by a bulk polymerization method. The above bulk polymerization method includes, for example, a continuous bulk polymerization method described in Chemical Engineering of Japan, Vol. 48, No. 6, page 415 (1984) (a so-called Toray method) and a continuous bulk polymerization method described in Chemical Engineering of Japan, Vol. 53, No. 6, page 423 (1989) (a so-called Mitsui Toatsu method). As an ABS resin in the present invention, either ABS resin can be suitably used. The resin composition (I) containing the above ABS resin and the aromatic polycarbonate resin as Component A-1 has excellent thermal stability, so that the molding temperature thereof can be increased, and it can therefore give a molded product having a small wall thickness. Further, the copolymerization method therefor may be any one of a one-stage copolymerization method and a multi-stage copolymerization method.

The AS resin is a thermoplastic resin obtained by copolymerization of a vinyl cyanide compound and an aromatic vinyl compound. The vinyl cyanide compound includes those that are described already, and acrylonitrile is preferred. The aromatic vinyl compound similarly includes those that are described already, and styrene and α-methylstyrene are preferred. Concerning the content of each component in the AS resin, when the amount of the entire AS resin is 100% by weight, the content of the vinyl cyanide compound is 5 to 50% by weight, preferably 15 to 35% by weight, and the content of the aromatic vinyl compound is 95 to 50% by weight, preferably 85 to 65% by weight. The AS resin may be a resin obtained by further copolymerization of the above copolymerizable other vinyl compound in addition to the above vinyl compound. The content thereof in the AS resin component is preferably 15% by weight or less. Further, an initiator, a chain transfer agent, etc., are used for the reaction as required, and can be selected from those that are conventionally known.

While the AS resin may be a resin produced by any one of bulk polymerization, suspension polymerization and emulsion polymerization methods, an AS resin produced by bulk polymerization is preferred. Further, the copolymerization method therefor may be any one of a one-stage copolymerization method and a multi-stage copolymerization method. The reduced viscosity of the above AS resin is 0.2 to 1.0 dl/g, preferably 0.3 to 0.5 dl/g (the method of measuring the reduced viscosity is according to the above-described method).

As the above AS resin, preferred is an AS resin which has an acrylonitrile content in the range of 15 to 35% by weight and a styrene content in the range of 85 to 65% by weight when the amount of the entire AS resin is 100% by weight, which is produced by bulk polymerization and which has a reduced viscosity of 0.3 to 0.5 dl/g. For the ABS resin, when the ABS copolymer and the AS copolymer are blended, the contents of the aromatic vinyl compound and the vinyl cyanide compound in one copolymer and the counterparts in the other copolymer may be the same or may be different, while these are preferably almost the same.

The above AS resin and ABS resin whose alkali (alkaline earth) metal content is decreased are suitable in view of excellent thermal stability and hydrolysis resistance. The alkali (alkaline earth) metal content in the styrene-containing resin is preferably less than 100 ppm, more preferably less than 80 ppm, still more preferably less than 50 ppm, particularly preferably less than 10 ppm. From the above viewpoint, an AS resin and an ABS resin according to a bulk polymerization method (particularly, Mitsui Toatsu method) are preferred. When an emulsifier is used for the AS resin and the ABS resin with respect to excellent thermal stability and hydrolysis resistance, the emulsifier is preferably selected from sulfonic acid salts, more preferably from alkylsulfonic acid salts. When a coagulator is used, the coagulator is preferably selected from sulfuric acid or an alkaline earth metal salt of sulfuric acid.

In the flame-retardant resin composition (I) of the present invention, the above resin component (Component A-1) may contain, as a hydrolysis preventer, a very small amount, for example, 0.5% by weight or less, of an inorganic additive such as silicic acid salt. By incorporating the above inorganic additive, the decomposition of the phosphoric ester (Component B) is also inhibited, and due to the inhibition thereof, the decomposition of the resin component is also inhibited.

In principle, the flame-retardant resin composition (I) of the present invention comprises the resin component (Component A-1) containing the aromatic polycarbonate resin and the styrene-containing resin and the flame retardant (Component B) as described above. Meanwhile, the above resin composition (I) may further contain titanium dioxide as a pigment, an inorganic filler as a reinforcement and a fluorine-containing compound as a dripping preventer or other additive.

Embodiments of a composition prepared by incorporating other components to the resin composition (I) will be explained as resin compositions (I-1) to (I-3).

(1) Resin Composition (I-1)

Flame-retardant resin composition (I-1) containing (A) Component A-1 as a resin component, (B) Component B as a flame retardant, (C) titanium dioxide (Component C) as a pigment, and (F) a fluorine-containing compound (Component F) as a dripping preventer, (i) the resin composition containing, per 100% by weight of the total of Component A-1 and Component B, 65 to 99% by weight of Component A-1 and 1 to 35% by weight of Component B, and (ii) the resin composition containing, per 100 parts by weight of the total of Component A-1 and Component B, 0.05 to 10 parts by weight of Component C and 0 to 5 parts by weight of Component F.

(2) Resin Composition (I-2)

Flaime-retardant resin composition (I-2) containing (A) Component A-1 as a resin component, (B) Component B as a flame retardant, (D) an inorganic filler (Component D) as a reinforcement, and (F) a fluorine-containing compound (Component F) as a dripping preventer, (i) the resin composition containing, per 100% by weight of the total of Component A-1 and Component B, 65 to 99% by weight of Component A-1 and 1 to 35% by weight of Component B, and (ii) the resin composition containing, per 100 parts by weight of the total of Component A-1 and Component B, 1 to 100 parts by weight of Component D and 0 to 5 parts by weight of Component F.

(3) Resin Composition (I-3)

Flaime-retardant resin composition (I-3) containing (A) Component A-1 as a resin component, (B) Component B as a flame retardant, (C) titanium dioxide.(Component C) as a pigment,
(D) an inorganic filler (Component D) as a reinforcement,
(E) other additive (Component E), and
(F) a fluorine-containing compound (Component F) as a dripping preventer,
(i) the resin composition containing, per 100% by weight of the total of Component A-1 and Component B, 65 to 99% by weight of Component A-1 and 1 to 35% by weight of Component B, and (ii) the resin composition containing, per 100 parts by weight of the total of Component A-1 and Component B, 0.08 to 10 parts by weight of Component C, 1 to 100 parts by weight of Component D, 0 to 10 parts by weight of Component E and 0 to 5 parts by weight of Component F.

The above resin compositions (I-1) to (I-3) will be explained further in detail hereinafter with respect of specific examples of the components and the contents of the components.

In the above resin compositions (I-1) to (I-3), the aromatic polycarbonate resin and the styrene-containing resin as Component (A-1) and Component B as a flame retardant are those which are specifically explained with regard to the above resin composition (I), and explanations thereof are therefor omitted.

In addition to the resin component (Component A-1) and the flame retardant (Component B), the resin composition (I-1) further contains titanium dioxide (Component C) as a pigment and optionally contains a fluorine-containing compound (Component F) as a dripping preventer.

In the resin composition (I-1), (i) per 100% by weight of the total of Component A-1 and Component B, the content of Component A-1 is 65 to 99% by weight, preferably 75 to 98% by weight, and the content of Component B is 1 to 35% by weight, preferably 2 to 25% by weight. Further, (ii) per 100 parts by weight of the total of Component A-1 and Component B, the content of titanium dioxide (Component C) is 0.05 to 10 parts by weight, preferably 0.1 to 5 parts by weight, particularly preferably 0.1 to 3 parts by weight, and the content of the fluorine-containing compound (Component F) is 0 to 5 parts by weight, preferably 0.01 to 1 part by weight, particularly preferably 0.1 to 0.8 part by weight.

In addition to the resin component (Component A-1) and the flame retardant (Component B), the resin composition (I-2) further contains an inorganic filler (Component D) as a reinforcement and optionally contains a fluorine-containing compound (Component F) as a dripping preventer.

In the resin composition (I-2), (i) per 100% by weight of the total of Component A-1 and Component B, the content of Component A-1 is 65 to 99% by weight, preferably 75 to 98% by weight, and the content of Component B is 1 to 35% by weight, preferably 2 to 25% by weight. Further, (ii) per 100 parts by weight of the total of Component A-1 and Component B, the content of the inorganic filler (Component D) is 1 to 100 parts by weight, preferably 1 to 50 parts by weight, particularly preferably 2 to 20 parts by weight, and the content of the fluorine-containing compound (Component F) is 0 to 5 parts by weight, preferably 0.01 to 1 part by weight, particularly preferably 0.1 to 0.8 part by weight.

In addition to the resin component (Component A-1) and the flame retardant (Component B), the resin composition (I-3) further contains titanium dioxide (Component C) as a pigment and an inorganic filler (Component D) as a reinforcement, and optionally contains a fluorine-containing compound (Component F) as a dripping preventer and other additive (Component E).

In the resin composition (I-3), (i) per 100% by weight of the total of Component A-1 and Component B, the content of Component A-1 is 65 to 99% by weight, preferably 75 to 98% by weight, and the content of Component B is 1 to 35% by weight, preferably 2 to 25% by weight. Further, (ii) per 100 parts by weight of the total of Component A-1 and Component B, the content of titanium dioxide (Component C) is 0.05 to 10 parts by weight, preferably 0.1 to 5 parts by weight, particularly preferably 0.1 to 3 parts by weight, the content of the inorganic filler (Component D) is 1 to 100 parts by weight, preferably 1 to 50 parts by weight, particularly preferably 2 to 20 parts by weight, the content of the fluorine-containing compound (Component F) is 0 to 5 parts by weight, preferably 0.01 to 1 part by weight, particularly preferably 0.1 to 8 parts by weight, and the content of other additive (Component E) is 0 to 10 parts by weight, preferably 0 to 0.8 part by weight, particularly preferably 0 to 6 parts by weight.

Those Components other than the resin component (A-1) and the flame retardant (Component B) in the resin compositions (I-1) to (I-3) will be explained in detail hereinafter.

Titanium dioxide (Component C) as a pigment may have any one of crystal forms of anatase type and rutile type. These types of titanium dioxide may be used as a mixture as required. Rutile type titanium dioxide is more preferred in view of initial mechanical properties and long-term weatherability. There may be used titanium dioxide having an anatase type crystal in a rutile type crystal. Further, $TiO_2$ produced by any one of a sulfuric acid method, a chlorine method and other various methods can be used, while $TiO_2$ produced by a chlorine method is relatively preferred. While the form of titanium dioxide (Component C) is not specially limited, particulate titanium dioxide is relatively preferred. The average particle diameter of titanium dioxide is preferably 0.01 to 0.4 $\mu$m, more preferably 0.1 to 0.3 $\mu$m, still more preferably 0.15 to 0.25 $\mu$m. The above average particle diameter is determined by measuring particles for areas with an image processor through an electron microscope, calculating circle-equivalent diameters on the basis of the areas and calculating the same on the basis of a weight average of the particle diameters (it is assumed that the particles have a constant specific gravity).

While titanium dioxide (Component C) can be used as it is, it is preferred to use titanium dioxide coated with a surface-treating agent. The surface-treating agent is preferably an inorganic surface-treating agent, and particularly, titanium dioxide surface-treated with aluminum oxide ($Al_2O_3$) is excellent. The above titanium dioxide surface-treated with $Al_2O_3$ has a $TiO_2$ content of 89 to 98% by weight, and an inorganic surface-treating agent, $Al_2O_3$, content of 0.5 to 4.5% by weight (the titanium dioxide component in titanium dioxide (Component C) will be represented by "$TiO_2$", and the entire pigment containing the surface-treating agent will be represented by "titanium dioxide pigment").

The $Al_2O_3$ surface-treating agent can be coated on $TiO_2$ surface by any one of generally employed methods. For example, the surface-coated titanium dioxide can be prepared by the following steps (1) to (8). That is, the method includes the steps of (1) preparing an aqueous slurry of untreated $TiO_2$ after dry pulverization, (2) wet-pulverizing said slurry to form fine particles, (3) collecting the fine particle slurry, (4) adding a water-soluble compound of aluminum salt to said fine particle slurry, (5) neutralizing the slurry to coat $TiO_2$ surface with hydrous oxide of aluminum, (6) removing byproducts, adjusting the pH of the slurry, filtering the slurry and washing an obtained cake with pure water, (7) drying a washed cake, and (8) milling the dried cake with a jet mill or the like. Besides the above method, for example, there may be also employed a method in which an active aluminum compound is reacted with $TiO_2$ particles in a gaseous phase. In the coating the $TiO_2$ surface with the $Al_2O_3$ surface-treating agent, the surface treatment may be followed by calcining, the surface treatment may be followed by re-surface treatment or the surface treatment may be followed by calcining and re-surface treatment.

Besides the oxide of aluminum, the surface treatment of $TiO_2$ can be carried out by surface treatment with an oxide of any one of various metals such as silicon, titanium, zirconium, antimony, tin and zinc. Of these, the surface treatment with silicon, i.e., $SiO_2$, is preferred. The above surface treatment may be any one of high-density treatment and low-density (porous) treatment.

The content of $TiO_2$ in titanium dioxide (Component C) is preferably 97% by weight or less, more preferably 96% by weight or less. Further, the content of $TiO_2$ in the titanium dioxide pigment as Component C is preferably at least 90% by weight, more preferably at least 91% by weight, still more preferably at least 92% by weight. Most preferably, the above $TiO_2$ content is in the range of 92 to 96% by weight.

Further, the content of $Al_2O_3$ in the titanium dioxide (Component C) is preferably 4% by weight or less, more preferably 3.8% by weight or less. Further, the content of $Al_2O_3$ in the titanium dioxide (Component C) is preferably at least 1.5% by weight, more preferably at least 2.5% by weight. The above content of $Al_2O_3$ is most preferably in the range of 2.5 to 3.8% by weight.

When the content of $TiO_2$ is less than the above lower limit, the durability of the resin composition against humidity and heat decreases. When the content of $Al_2O_3$ is less than the above lower limit, the resin composition is liable to have low impact resistance and is poor in hue. Further, when the content of $Al_2O_3$ is too large, the resin composition is sometimes poor in flame retardancy.

The titanium dioxide (Component C) may be surface-treated with an organic compound. The surface-treating agent for the above can be selected from various treating agents such as polyol, amine and silicone treating agents. Examples of the polyol surface-treating agent include pentaerythritol, trimethylolethane and trimethylolpropane. Examples of the amine surface-treating agent include acetic acid salt of triethanolamine and acetic acid salt trimethylolamine. Examples of the silicone surface-treating agent include alkylchlorosilanes (such as trimethylchlorosilane), alkylalkoxysilanes (such as methyltrimethoxysilane, decyltrimethoxysilane, etc.) and alkylhydrogenpolysiloxanes (such as methylhydrogenpolysiloxane). Proper surface treatment with the above organic compound is preferred since the titanium dioxide can be improved in dispersibility and can be efficiently improved in hydrolysis resistance of the resin composition. The amount of the organic compound for the surface treatment per 100% by weight of Component C is preferably 1% by weight or less, more preferably 0.6% by weight or less, still more preferably 0.4% by weight or less. The lower limit of the above amount is 0.05% by weight or more. The surface-treating agent that is the organic compound may have a constitution in which the organic compound is separately added when the raw materials for the resin composition of the present invention are mixed by melt-kneading or the like to prepare the composition, and as a result, the titanium dioxide pigment is surface-treated.

Examples of the inorganic filler (Component D) as a reinforcement include talc, wollastonite, mica, clay, montmorillonite, smectite, kaolin, calcium carbonate, glass fibers, glass beads, glass balloons, glass milled fibers, glass flakes, carbon fibers, carbon flakes, carbon beads, carbon milled fibers, metal flakes, metal fibers, metal coated glass fibers, metal coated carbon fibers, metal coated glass flakes, silica, ceramic particles, ceramic fibers, ceramic balloons, aramid particles, aramid fibers, polyarylate fibers, graphite, and various whiskers such as potassium titanate whiskers, aluminum borate whiskers and basic magnesium sulfate whiskers. The above reinforcing fillers may be incorporated alone or in combination.

Of these, at least one member selected from the group consisting of talc, mica, wollastonite, glass fibers, glass milled fibers, glass flakes, carbon fibers and metal coated carbon fibers is preferred as a filler for providing excellent mechanical strength, and at least one member selected from the group consisting of talc, mica, wollastonite, glass fibers, glass milled fibers and glass flakes is particularly preferred.

An embodiment containing the inorganic filler (Component D) is preferred for the following reason. That is, when a resin composition contains the inorganic filler, a resin around the filler has a high stress in most cases, and the deterioration of the resin in a portion where the stress is high is easily accelerated. There are therefore some cases where a resin composition containing a filler suffers a clear decrease in strength caused by the deterioration of the resin. As disclosed in JP-A-2000-072962, a silicate-containing filler improves hydrolysis resistance. The effect of titanium dioxide (Component C) is therefore not remarkable in such a case, while the titanium dioxide has good properties. On the other hand, as for fillers having no effect on improving hydrolysis resistance such as carbon fibers and metal coated carbon fibers, it can be said that using such fillers and the titanium oxide in combination is preferred because of a large effect on it.

For the above reasons, silicate-containing fillers such as talc, wollastonite, mica, glass fibers and glass milled fibers are preferred as a filler (Component D) since a resin composition containing any one of them is excellent in hydrolysis resistance, and talc and wollastonite which are fine particles are specially preferred in that a resin composition containing any one of them comes to have excellent hydrolysis resistance indicated by surface impact strength as an index. Particularly, wollastonite can be suitably used as a filler that can suppress a decrease in scratch resistance of a molded product surface. The above properties are suitable properties required for large-size and non-coated molded products, so that the flame-retardant thermoplastic resin composition containing wollastonite, provided by the present invention, suitably provides large-size and non-coated molded products. On the other hand, carbon fibers and metal coated carbon fibers are preferred in that they produce a larger effect on improvements in hydrolysis resistance.

When the filler (Component D) is incorporated, the resin composition may contain a breaking inhibitor for inhibiting the breaking of the filler. The breaking inhibitor hampers the adhesion between a matrix resin and the filler and decreases a stress that works on the filler during melt-kneading, so that it inhibits the breaking of the filler. The effect of the breaking inhibitor includes (1) an improvement in rigidity (larger aspect ratio of the filler is attained), (2) an improvement in toughness (it is easy to exhibit the toughness of a matrix resin and the breaking inhibitor is effective when a resin composition contains, as a main component, an aromatic polycarbonate resin having excellent toughness), and (3) an improvement in electrical conductivity (the case of an electrically conductive filler). Specifically, the breaking inhibitor refers to (i) a compound having a low affinity with a resin and coated directly on a filler surface and (ii) a compound having a structure having a low affinity with a resin and having a functional group that can react with a filler surface.

The compound having a low affinity with a resin typically includes various lubricants. Examples of the lubricants include mineral oils, synthetic oils, higher fatty acid esters, higher fatty acid amides, polyorganosiloxanes (silicone oil, silicone gum, etc.), olefin waxes (paraffin wax, polyolefin wax, etc.), polyalkylene glycols, and fluorine oils such as fluorinated fatty acid esters, trifluorochloroethylene and polyhexafluoropropylene glycol.

The method of directly coating a filler surface with a compound having a low affinity with a resin includes (1) a method in which the filler is immersed directly in the compound or immersed in a solution or an emulsion of the compound, (2) a method in which the filler is allowed to pass through vapors or a powder of the compound, (3) a method in which the filler is exposed to a powder, etc., of the compound having a high velocity and (4) a mechanochemical method in which the filler and the compound are rubbed against each other.

The compound having a structure having a low affinity with the resin and having a functional group that can react with the filler surface includes the above lubricants modified with various functional groups. Examples of the above functional groups include carboxyl, carboxylic anhydride, epoxy, oxazoline, isocyanate, ester, amino and alkoxysilyl groups.

One of the suitable breaking inhibitors is an alkoxysilane compound having a silicon atom to which an alkyl group having at least 5 carbon atoms is bonded. The number of the above carbon atoms of alkyl group bonding to the silicon atom is preferably 5 to 60, more preferably 5 to 20, still more preferably 6 to 18, particularly preferably 8 to 16. Suitably, one or two such alkyl groups are bonded, and particularly preferably, one such alkyl group is bonded. The alkoxyl group preferably includes methoxy and ethoxy groups. The above alkoxysilane compound is preferred since it has high reactivity to a reinforcing filler surface and has excellent coating efficiency. Such an alkoxysilane compound is therefore suitable for a fine reinforcing filler.

One of the preferred breaking inhibitors is a polyolefin wax having at least one function group selected from a carboxyl group and a carboxylic anhydride group. Concerning its molecular weight, the weight average molecular weight of the breaking inhibitor is preferably 500 to 20,000, more preferably 1,000 to 15,000. In the above polyolefin wax, the amount of the carboxyl group and carboxylic anhydride group per g of the lubricant having at least one functional group selected from a carboxyl group and a carboxylic anhydride group is preferably in the range of 0.05 to 10 meq/g, more preferably 0.1 to 6 meq/g, still more preferably 0.5 to 4 meq/g. A polyolefin wax modified with the other functional group also preferably contains functional group in an amount equivalent to the amount of the carboxyl group.

As a breaking inhibitor, particularly preferred is a copolymer formed from α-olefin and maleic anhydride. The above copolymer can be prepared by melt polymerization or bulk polymerization in the presence of a radical catalyst according to a conventional method. The above α-olefin preferably includes α-olefins having an average of 10 to 60 carbon atoms, more preferably, includes α-olefins having an average of 16 to 60 carbon atoms, and still more preferably, includes α-olefins having an average of 25 to 55 carbon atoms. The content of the breaking inhibitor per 100 parts by weight of the total of Component A-1 and Component B in the resin composition is preferably 0.01 to 2 parts by weight, more preferably 0.05 to 1.5 parts by weight, still more preferably 0.1 to 0.8 part by weight.

The resin composition of the present invention preferably contains a fluorine-containing compound (Component F) as a dripping preventer for preventing the dripping of a melt during combustion and further improving the flame retardancy of a product.

The fluorine-containing compound (Component F) is preferably a fluorine-containing polymer having the capability of forming fibrils. The above polymer includes polytetrafluoroethylene, tetrafluoroethylene copolymers (e.g., a tetrafluoroethylene/hexafluoropropylene copolymer, etc.), a partially fluorinated polymer disclosed in U.S. Pat. No. 4,379,910, and a polycarbonate resin produced from fluorinated diphenol. Of these, polytetrafluoroethylene (to be sometimes referred to as "PTFE" hereinafter) is preferred.

PTFE having the capability of forming fibrils has a very high molecular weight and tends to form fibrils of intercombined PTFE due to an external action such as a shearing force. The molecular weight thereof, as a number average molecular weight determined on the basis of standard specific gravity, is 1,000,000 to 10,000,000, more preferably 2,000,000 to 9,000,000. Such PTFE can be used not only in the form of a solid but also in the form of an aqueous dispersion. Further, the above PTFE having the capability of forming fibrils can be used in the form of a mixture thereof with other resin, for improving its dispersibility in a resin and attaining further excellent flame retardancy and mechanical properties.

As commercial products, the above PTFE having the capability of forming fibrils includes, for example, Teflon 6J supplied by Du Pont-Mitsui Fluorochemicals Co., Ltd. and POLYFLON MPA FA500, F-201L supplied by Daikin Industries, Ltd. As a commercial product in the form of an aqueous dispersion, typical examples of PTFE include Fluon AD-1, AD-936 supplied by Asahi ICI Fluoropolymers Co., Ltd., Fluon D-1, D-2 supplied by Daikin Industries, Ltd. and Teflon 30J supplied by Du Pont-Mitsui Fluorochemicals Co., Ltd.

PTFE in the form of a mixture can be selected from those obtained by (1) a method in which an aqueous dispersion of PTFE and an aqueous dispersion or solution of an organic polymer are mixed and co-precipitated to obtain a co-aggregated mixture (method described in JP-A-60-258263 and JP-A-63-154744), (2) a method in which an aqueous dispersion of PTFE and dry organic polymer particles are mixed (method described in JP-A-4-272957), (3) a method in which an aqueous dispersion of PTFE and a solution of organic polymer particles are uniformly mixed and solvents for these are simultaneously removed from the mixture (method described in JP-A-06-220210 and JP-A-08-188653), (4) a method in which a monomer to form an organic polymer is polymerized in an aqueous dispersion of PTFE (method described in JP-A-9-95583), and (5) a method in which an aqueous dispersion of PTFE and an organic polymer dispersion are uniformly mixed, a vinyl monomer is polymerized in the mixture and then a mixture is obtained (method described in JP-A-11-29679). As a commercial product, PTFE in the form of the above mixture includes "METABLEN A3000" (trade name) supplied by Mitsubishi Rayon Co., Ltd. and "BLENDEX B449" (trade name) supplied by GE Specialty Chemicals Inc.

Concerning the content of PTFE in the above mixture, the content of PTFE per 100% by weight of the PTFE mixture is preferably 1 to 60% by weight, more preferably 5 to 55% by weight. When the content of PTFE is in the above range, good dispersibility of PTFE can be attained.

The resin composition (I) of the present invention including the resin compositions (I-1) to (I-3) can contain other additive (Component E) other the Components C, D and F so long as the object of the present invention is not impaired.

Other additive (Component E) can be selected, for example, from an impact modifier, a heat stabilizer, an antioxidant, an ultraviolet absorbent, a mold release agent, an antistatic agent, a flame retardant aid, a nucleating agent, an anti-fungus agent, a lubricant, a colorant and a fluorescent brightener. These can be selected from those which are known as additives to resins.

Specific compounds of some of the above various additives that can be used as other additive (Component E) will be explained below.

The impact modifier includes various elastic polymers. While specific examples thereof will be described below, it should be understood that the impact modifier shall not include those examples that come under the styrene-containing resin described as Component A-1. That is, the impact modifier refers to copolymers which are obtained by copolymerization of a rubber component having a glass transition temperature of 10° C. or lower, preferably –10° C. or lower, more preferably –30° C. or lower and a monomer component copolymerizable with the rubber component and which are other than the styrene-containing resins included in the above Component A-1. The rubber component includes polybutadiene, polyisoprene, diene copolymers (such as an acrylonitrile-butadiene copolymer and acryl-butadiene rubber (a copolymer from alkyl acrylate or alkyl methacrylate and butadiene)), copolymers from ethylene and α-olefins (such as ethylene-propylene random copolymer and block copolymer and ethylene-butene random copolymer and block copolymer), copolymers from ethylene and unsaturated carboxylic esters (such as an ethylene-methacrylate copolymer and an ethylene-butyl acrylate copolymer), copolymers from ethylene and aliphatic vinyl (such as an ethylene-vinyl acetate copolymer), terpolymers from ethylene, propylene and non-conjugated dienes (such as an ethylene-propylene-hexadiene copolymer), acrylic rubbers (such as polybutyl acrylate, poly(2-ethylhexyl acrylate) and a copolymer from butyl acrylate and 2-ethylhexyl acrylate), and silicone rubbers (such as polyorganosiloxane rubber and IPN type rubber formed of a polyorganosiloxane rubber component, a polyalkyl (meth) acrylate rubber component, which is a rubber having a structure in which two rubber components are intertwined with each other so that they are not separated, and IPN type rubber formed of a polyorganosiloxane rubber component and a polyisobutylene rubber component).

The monomer component that is copolymerized with the above rubber component preferably includes a vinyl cyanide compound, a (meth)acrylic ester compound and a (meth) acrylic acid compound. Other monomer component includes epoxy-group-containing methacrylic esters such as glycidyl methacrylate, maleimide-containing monomers such as maleimide, N-methylmaleimide and N-phenylmaleimide, and α,β-unsaturated carboxylic acids such as acrylic acid, methacrylic acid, maleic acid, maleic anhydride, phthalic acid, itaconic acid and anhydrides thereof.

More specifically, the impact modifier includes an MB (methyl methacrylate-butadiene) polymer, an MA (methyl methacrylate-acrylic rubber) polymer, a methyl methacrylate-acryl-butadiene rubber copolymer and a methyl methacrylate (acryl-silicone IPN rubber) polymer.

Other impact modifier can be selected from various thermoplastic elastomers such as an olefin-based thermoplastic elastomer, a polyurethane-based thermoplastic elastomer, a polyester-based thermoplastic elastomer and polyamide-based thermoplastic elastomer.

When the above elastic polymer is used as an impact modifier, the content of the rubber component in the elastic polymer is generally 40 to 95% by weight, more preferably 50 to 85% by weight. Similarly, the content of a soft segment in the thermoplastic elastomer is generally 40 to 95% by weight, more preferably 50 to 85% by weight.

Further, other impact modifier can be selected from polyethylene, polyorganosiloxane or copolymers formed from olefins and unsaturated carboxylic esters. The impact modifiers can be used alone or as a mixture of two or more impact modifiers. The content of the impact modifier per 100 parts by weight of the total of the Component A-1 and Component B is preferably 10 parts by weight or less, more preferably 8 parts by weight or less, still more preferably 6 parts by weight or less. When Component A-1 contains no MBS resin, it is preferred to incorporate the impact modifier in view of impact resistance such as surface impact strength. In this case, the impact modifier is preferably incorporated in an amount of at least 0.5 part by weight, more preferably, at least 1 part by weight, per 100 parts by weight of the total of Component A and Component B.

The heat stabilizer includes phosphorus-containing stabilizers, and can be preferably selected from phosphate compounds and phosphate compounds. Examples of the phosphite compounds include triphenyl phosphate, tris-nonylphenyl phosphate, tris(2,4-di-tert-butylphenyl) phosphite, tridecyl phosphate, trioctyl phosphate, trioctadecyl phosphite, didecylmonophenyl phosphate, dioctylmonophenyl phosphite, diisopropylmonophenyl phosphate, monobutyldiphenyl phosphate, monodecyl-diphenyl phosphite, monooctyldiphenyl phosphate, bis(2,6-di-tert-butyl-4-methylphenyl)pentaerythritol diphosphite, 2,2-methylenebis(4,6-di-tert-butylphenyl)octylphosphite, bis(nonylphenyl)pentaerythritol diphosphite and bis(2,4-di-tert-butylphenyl)pentaerythritol diphosphite. Of these, tris (2,4-di-tert-butylphenyl)phosphite is preferred from the viewpoint of thermal stability.

Examples of the phosphate compound for use as a heat stabilizer include tributyl phosphate, trimethyl phosphate, tricresyl phosphate, triphenyl phosphate, trichlorophenyl phosphate, triethyl phosphate, diphenylcresyl phosphate, diphenylmonoorthoxenyl phosphate, tributoxyethyl phosphate, dibutyl phosphate, dioctyl phosphate and diisopropyl phosphate. Of these, triphenyl phosphate and trimethyl phosphate are preferred.

In view of thermal stability, further, other heat stabilizer can be selected from phosphonite compounds such as tetrakis(2,4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite and bis(2,4-di-tert-butylphenyl)-4-biphenylene diphosphonite. The above heat stabilizers may be used alone or in combination.

The antioxidant includes phenol compounds, and specific examples thereof include triethylene glycol-bis(3-(3-tert-butyl-5-methyl-4-hydroxyphenyl)propionate), 1,6-hexanediol-bis(3-(3,5-di-tert-butyl-4-hydroxyphenyl) propionate), pentaerythritol-tetrakis(3-(3,5-di-tert-butyl-4-hydroxyphenyl)propionate), octadecyl-3-(3,5-di-tert-butyl-4-hydroxyphenyl)propionate, 1,3,5-trimethyl-2,4,6-tris(3,5-di-tert-butyl-4-hydroxybenzyl)benzene, N,N-hexamethylenebis(3,5-di-tert-butyl-4-hydroxyhydrocinnamide), 3,5-di-tert-butyl-4-hydroxy-benzyl phosphonate-diethyl ester, tris(3,5-di-tert-butyl-4-hydroxybenzyl)isocyanurate and 3,9-bis{1,1-dimethyl-2-[β-(3-tert-butyl-4-hydroxy-5-methylphenyl)propionyloxy]ethyl}-2,4,8,10-tetraoxaspiro(5,5)undecane.

The ultraviolet absorbent includes benzophenone ultraviolet absorbents typified, for example, by 2,2'-dihydroxy-4-methoxybenzophenone and benzotriazole ultraviolet absorbents typified, for example, by 2-(3-tert-butyl-5-methyl-2-hydroxyphenyl)-5-chlorobenzotriazole, 2-(3,5-di-tert-butyl-2-hydroxyphenyl)-5-chlorobenzotriazole, 2,2'-methylenebis[4-(1,1,3,3-tetramethylbutyl)-6-(2H-benzotriazol-2-yl)phenol], 2-[2-hydroxy-3,5-bis(α,α-dimethylbenzyl)phenyl]-2H-benzotriazole and 2-(3,5-di-tert-amyl-2-hydroxyphenyl)benzotriazole. Further, the ultraviolet absorbent can be also selected from hydroxyphenyltriazine ultraviolet absorbents such as 2-(4,6-diphenyl-1,3,5-triazin-2-yl)-5-hexyloxyphenol and 2-(4,6-bis(2,4-dimethylphenyl)-1,3,5-triazin-2-yl)-5-hexyloxyphenol and hindered amine photostabilizers such as bis(2,2,6,6-tetramethyl-4-piperidyl)sebacate and bis(1,2,2,6,6-pentamethyl-4-piperidyl)sebacate. These may be used alone or in combination.

Further, the mold release agent includes an olefin wax, silicone oil, organopolysiloxane, a higher fatty acid ester of a monohydric or polyhydric alcohol, a paraffin wax and bees wax. The above phosphorus-containing stabilizer, antioxidant, ultraviolet absorbent, photo-stabilizer, mold release agent, and other additives such as a colorant can be incorporated in a known amount in which such are applied to an aromatic polycarbonate resin and so long as the amount is not over the upper limit of Component E.

The flame-retardant resin composition (II) of the present invention will be explained below.

The resin composition (II) contains a resin component different from that of the resin composition (I) but contains the same flame retardant (Component B).

That is, the resin composition (II) comprises (A) a resin component (Component A-2) containing 20 to 80% by weight of a polyphenylene ether resin and 80 to 20% by weight of a polystyrene, and (B) a flame retardant (Component B) that is a phosphoric ester of the above formula (I), the phosphoric ester containing, per 100% by weight thereof, 3% by weight or less of a component having a condensation degree n of 0, 86.5 to 98.5% by weight of a component having a condensation degree n of 1, 1 to 9% by weight of a component having a condensation degree n of 2 and 1.5% by weight or less of a component having a condensation degree n of $\geq 3$, and having a weight average condensation degree N in the range of 1.01 to 1.10 when the weight average condensation degree N is calculated without the component having a condensation degree n of 0, the flame-retardant resin composition (II) containing, per 100% by weight of the total of Component A-2 and Component B, 65 to 99% by weight of Component A-2 and 1 to 35% by weight of Component B.

In the above resin composition (II), the phosphoric ester as a flame retardant (Component B) is preferably a phosphoric ester of the above formula (I) containing, per 100% by weight thereof, 2.5% by weight or less of a component having a condensation degree n of 0, 89.5 to 98.5% by weight of a component having a condensation degree n of 1, 1 to 7% by weight of a component having a condensation degree n of 2 and a 1% by weight or less of a component having a condensation degree n of $\geq 3$, and having a weight average condensation degree N in the range of 1.01 to 1.09 when the weight average condensation degree N is calculated without the component having a condensation degree n of 0.

In the resin composition (II), further, the resin component (Component A-2) preferably contains 25 to 70% by weight of a polyphenylene ether resin and 75 to 30% by weight of a polystyrene.

The polyphenylene ether resin in the resin component (Component, A-2) is a polymer or copolymer of a nuclear-substituted phenol having a phenylene ether structure (to be sometimes simply referred to as "PPE polymer" hereinafter).

Typical examples of the polymer of a nuclear-substituted phenol having a phenylene ether structure include poly(2,6-dimethyl-1,4-phenylene)ether, poly(2-methyl-6-ethyl-1,4-phenylene)ether, poly(2,6-diethyl-1,4-phenylene)ether, poly(2-ethyl-6-n-propyl-1,4-phenylene)ether, poly(2,6-di-n-propyl-1,4-phenylene)ether, poly(2-methyl-6-n-butyl-1,4-phenylene)ether, poly(2-ethyl-6-isopropyl-1,4-phenylene)ether, poly(2-methyl-6-hydroxyethyl-1,4-phenylene)ether and poly(2-methyl-6-chloroethyl-1,4-phenylene)ether. Of these, poly(2,6-dimethyl-1,4-phenylene)ether is particularly preferred.

Typical examples of the copolymer of a nuclear-substituted phenol having a phenylene ether structure include a copolymer from 2,6-dimethylphenol and 2,3,6-trimethylphenol, a copolymer from 2,6-dimethylphenol and o-cresol and a copolymer from 2,6-dimethylphenol, 2,3,6-trimethylphenol and o-cresol.

While the method of producing the above PPE polymer is not specially limited, the PPE polymer can be produced, for example, by oxidation coupling polymerization of 2,6-xylenol in the presence of dibutylamine according to the method described in U.S. Pat. No. 4,788,277 (counterpart of Japanese Patent Application No. 62-77570).

Further, while polyphenylene ether resins having various molecular weights and various molecular weight distributions can be used, the reduced viscosity of such polyphenylene ether resins in a 0.5 g/dl chloroform solution at 30° C. is preferably in the range of 0.20 to 0.70 dl/g, preferably in the range of 0.30 to 0.55 dl/g of molecular weights.

Further, the polyphenylene ether resin may contain, as a partial structure, other various phenylene ether units that it has been proposed conventionally that a polyphenylene ether resin may contain, so long as the object of the present invention is not impaired. Examples of such phenylene ether units that have been proposed to be co-present in a small amount include 2-(dialkylaminomethyl)-6-methylphenylene ether unit and 2-(N-alkyl-N-phenylaminomethyl)-6-methylphenylene ether unit described in JP-A-63-12698 and JP-A-63-301222. Further, the polyphenylene ether resin includes a polyphenylene ether resin having a main chain to which a small amount of diphenoquinone is bonded.

In the resin composition (II), the polystyrene in the resin component (Component A-2) is a resin obtained from styrene as a main monomer, and it refers to a polystyrene resin (PS resin) and a high-impact polystyrene (HIPS resin).

As described already, the flame-retardant resin composition (II) of the present invention is basically composed of the resin component (Component A-2) containing a polyphenylene ether resin and a styrene resin and a flame retardant (Component B). The resin composition (II) may further contain titanium dioxide as a pigment and an inorganic filler as a reinforcement or other additive.

Embodiments of a composition prepared by incorporating other components to the resin composition (II) will be explained as resin compositions (II-1) to (II-3).

(1) Resin Composition (II-1)
  A flame-retardant resin composition (II-1) containing
  (A) Component A-2 as a resin component
  (B) Component B as a flame retardant, and
  (C) titanium dioxide as a pigment (Component C),
  (i) the resin composition containing, per 100% by weight of the total of Component A-2 and Component B, 65 to 99% by weight of Component A-2 and 1 to 35% by weight of Component B, and (ii) the resin composition containing, per 100 parts by weight of the total of Component A-2 and Component B, 0.05 to 10 parts by weight of Component C.

(2) Resin Composition (II-2)
  A flame-retardant resin composition (II-2) containing
  (A) Component A-2 as a resin component
  (B) Component B as a flame retardant, and
  (D) an inorganic filler as a reinforcement (Component D),
  (i) the resin composition containing, per 100% by weight of the total of Component A-2 and Component B, 65 to 99% by weight of Component A-2 and 1 to 35% by weight of Component B, and (ii) the resin composition containing, per 100 parts by weight of the total of Component A-2 and Component B, 1 to 100 parts by weight of Component D.

(3) Resin Composition (II-3)
  A flame-retardant resin composition (II-3) containing
  (A) Component A-2 as a resin component
  (B) Component B as a flame retardant,
  (C) titanium dioxide as a pigment (Component C), and
  (D) an inorganic filler as a reinforcement (Component D),
  (i) the resin composition containing, per 100% by weight of the total of Component A-2 and Component B, 65 to 99% by weight of Component A-2 and 1 to 35% by weight of Component B, and (ii) the resin composition containing, per 100 parts by weight of the total of Component A-2 and Component B. 0.05 to 10 parts by weight of Component C and 1 to 100 parts by weight of Component D.

The above resin compositions (II-1) to (II-3) will be explained further in detail with respect of specific examples of the components and the contents of the components.

In the above resin compositions (II-1) to (II-3), the polyphenylene ether resin and polystyrene as the resin component (A-2) and Component B as a flame retardant are those which are specifically explained with regard to the above resin composition (II), and explanations thereof are therefor omitted.

The resin composition (II-1) contains the resin component (Component A-2) and the flame retardant (Component B) and further contains titanium dioxide as a pigment (Component C). In the resin composition (II-1), (i) per 100% by weight of the total of Component A-2 and Component B, the content of Component A-2 is 65 to 99% by weight, preferably 75 to 98% by weight, and the content of Component B is 1 to 35% by weight, preferably 2 to 25% by weight. Further, (ii) per 100 parts by weight of the total of Component A-2 and Component B, the content of titanium dioxide (Component C) is 0.05 to 10 parts by weight, preferably 0.1 to 8 parts by weight, particularly preferably 0.1 to 5 parts by weight.

The resin composition (II-2) contains the resin component (Component A-2) and the flame retardant (Component B) and further contains an inorganic filler as a reinforcement (Component D). In the resin composition (II-3), (i) per 100% by weight of the total of Component A-2 and Component B, the content of Component A-2 is 65 to 99% by weight, preferably 75 to 98% by weight, and the content of Component B is 1 to 35% by weight, preferably 2 to 25% by weight. Further, (ii) per 100 parts by weight of the total of Component A-2 and Component B, the content of Component D is 1 to 100 parts by weight, preferably 1 to 50 parts by weight, particularly preferably 2 to 40 parts by weight.

The resin composition (II-3) contains the resin component (Component A-2) and the flame retardant (Component B) and further contains titanium dioxide as a pigment (Component C) an inorganic filler as a reinforcement (Component D). In the resin composition (II-3), (i) per 100% by weight of the total of Component A-2 and Component B, the content of Component A-2 is 65 to 99% by weight, preferably 75 to 98% by weight, and the content of Component B is 1 to 35% by weight, preferably 2 to 25% by weight. Further, (ii) per 100 parts by weight of the total of Component A-2 and Component B, the content of Component C is 0.05 to 10 parts by weight, preferably 0.1 to 8 parts by weight, particularly preferably 0.1 to 5 parts by weight, and the content of Component D is 1 to 100 parts by weight, preferably 1 to 50 parts by weight, particularly preferably 2 to 40 parts by weight.

Those Components other than the resin component (A-2) and the flame retardant (Component B) in the resin compositions (II-1) to (II-3) will be explained hereinafter. The titanium dioxide as a pigment (Component C) and the inorganic filler as a reinforcement (Component D) can be selected from those explained with regard to the aforementioned resin compositions (I-1) to (I-3), and preferred examples thereof explained with regard to the aforementioned resin compositions (I-1) to (I-3) are also preferred as well. Explanations of specific examples of Component C and Component D are therefore omitted. The resin composition (II) including the resin compositions (II-1) to (II-3) can contain other additive (Component E). Kinds and amounts of the other additive (Component E) are substantially the same as those explained with regard to the aforementioned resin compositions (I-1) to (I-3), and explanations thereof are therefore omitted.

The flame-retardant resin composition (I) or (II) of the present invention can be produced by any method. For example, they can be produced by a method in which Component A and Component B are fully mixed together with other optional component(s) with a preliminary mixing means such as a V-blender, a Henschel mixer, a mechanochemical device or an extrusion mixer, the mixture is granulated with an extrusion granulator or a briquetting machine, and then, the granulated product is melt-kneaded with a melt kneader typified by a vented twin-screw extruder and pelletized with a machine such as a pelletizer.

In addition to the above method, there can be employed a method in which each component is independently fed to a melt-kneader typified by a vented twin-screw extruder or a method in which parts of the components are preliminarily mixed and the preliminary mixture is fed to a melt-kneader independently of the remaining components. The method of the preliminary mixing includes, for example, a method in which, when a component having the form of a powder is included in Component A, part of such a powder and additive(s) to be incorporated are blended, to prepare a master batch of the additive(s) diluted with the powder.

Further, there is employed a method in which one component is independently fed to some place in a melt extruder. When components to be incorporated include a component having a liquid form, a so-called liquid injector or liquid adding device can be used for feeding such a component to the melt extruder. The above liquid injector or liquid adding device is preferably selected from those having a heating device. When the above components are melt-kneaded, the heating temperature is generally set in the range of 240 to 340° C.

Generally, the flame-retardant resin composition of the present invention can give various products when pellets thereof are injection-molded to obtain molded articles. In the above injection molding, not only a molding method according to a general cold runner system but also a molding method according to a hot runner system can be employed. In the above injection molding, molded articles can be obtained not only by a general molding method but also by any one of injection molding methods such as injection compression molding, injection press molding, gas-assisted injection molding, expansion molding (including a molding method based on the injection of a supercritical fluid), insert molding, in-mold coating molding, heat-insulated-mold-applied molding, rapid heating cooling molding, two-color molding, sandwich molding or ultra-high speed injection molding methods, which are employed depending upon purposes. These various molding methods have advantages that are already well known.

The flame-retardant resin composition of the present invention has excellent capability of forming a molded product having a small wall thickness. Particularly, it can decrease molding defects such as a gas-burned color of a resin and a transfer failure in a rib end portion of a molded product having a rib structure. Particularly, the flame-retardant thermoplastic resin composition of the present invention is effective for an injection molded article having a structure in which t1, t2 and h that satisfy $0.8 \leq t1 \leq 2.5$ (mm) (preferably $1.0 \leq t1 \leq 2.0$ (mm)), $0.4 \leq t2 \leq 2.0$ (mm) (preferably $0.5 \leq t2 \leq 1.8$ (mm)) and $10 \leq h \leq 50$ (mm) in which t1 is a thickness of base portion of a rib, t2 is a thickness of end portion of the rib and h is a height of the rib. Further, The flame-retardant resin composition of the present invention is effective particularly for an injection molded article having a structure in which the rib satisfies $0.8 \leq t_1 \leq 2.5$ (mm) (preferably $1.0 \leq t1 \leq 2.0$ (mm)), $0.4 \leq t2 \leq 2.0$ (mm) (preferably $0.5 \leq t2 \leq 1.8$ (mm)) and $20 \leq h \leq 50$ (mm).

The flame-retardant resin composition of the present invention also has excellent suitability to ultra-high speed injection molding. The above injection molding method is sometimes likely to cause appearance defects such as a gas-burned color and a transfer failure, as compared with a normal injection molding method. According to the present invention, the flame-retardant resin composition of the present invention can provide a molded article having excellent flowability and appearance even when the molded article is formed by charging the flame-retardant resin composition into a mold at an injection rate of at least 200 mm/sec, preferably at least 300 mm/sec. Further, the ultra-high speed injection molding method may be employed in combination with a gas-assisted molding method, an insert molding method, a heat-insulated-mold-applied molding method, a rapid heating cooling molding method, a two-color molding method or a sandwich molding method as required.

Further, the flame-retardant resin composition of the present invention can be extrusion-molded and used in the form of various profile extrusion articles, a sheet or a film. For forming a sheet or a film, an inflation method, a calender method, a casting method, or the like can be also employed. Further, the flame-retardant resin composition of the present invention can be formed as a heat shrinkable tube by applying a stretching operation. Further, the resin composition of the present invention can be formed into a hollow molded article by rotary molding or blow molding.

The flame-retardant thermoplastic resin composition of the present invention is suitable particularly in the fields of housings of OA machines and electric and electronic appliances. It is particularly suitable for housings of a personal computer, a notebook computer, game machines (a home-use game machine, a business-use game machine, a pinball game machine and a slot machine) and displays (CRT, a liquid crystal display, a plasma display, a projector and an organic EL display) and also as housings of a printer, a copying machine, a scanner and a facsimile machine (including a multi-purpose machine of these). Especially, the flame-retardant resin composition (I) is suitable for housings of these, and particularly suitable for housings of large machines such as a notebook computer, a display, a game machine and a copying machine and its multi-purpose machine. Especially, the flame-retardant resin composition (I) is suitable for these housings having a rib satisfying the above conditions. Further, the flame-retardant resin composition (I) containing wollastonite as an inorganic filler (Component D) has excellent surface scratch resistance, so that it has properties suitable for housings of non-coated large-size machines. According to the present invention, therefore, there is provided a non-coated housing formed of the flame-retardant resin composition (I) containing wollastonite as an inorganic filler (Component D), and there is more preferably provided a housing having a rib satisfying the aforementioned conditions, and there are still more preferably provided housings of a notebook computer, a display, a game machine, a copying machine and a multi-purpose machine of these.

The flame-retardant thermoplastic resin composition of the present invention is useful for wide use, for example, in other fields of a personal digital assistant (so-called PDA), a cellular phone, portable books (portable dictionary, etc.), a portable TV, drives of recording media (CD, MD, DVD, next-generation high-density disk, hard disk, etc.), readers of recording media (IC card, smart media, memory stick, etc.), an optical camera, a digital camera, parabolic antenna, an electric-powered tool, VTR, an iron, a hair dryer, a rice cooker, a microwave, sound apparatus, lightening apparatus, a refrigerator, an air conditioner, an air cleaner, a minus ion generator and a typewriter. Resin products formed of the flame-retardant thermoplastic resin composition of the present invention can be applied to various parts such as housings of these. As other resin product, the flame-retardant thermoplastic resin composition of the present invention can be applied to automobile parts such as a lamp socket, a lamp reflector, a lamp housing, an instrumental panel, a center console panel, a deflector part, a car navigation system part and a car audio-visual part.

Explanations of Symbols

Figure 1:
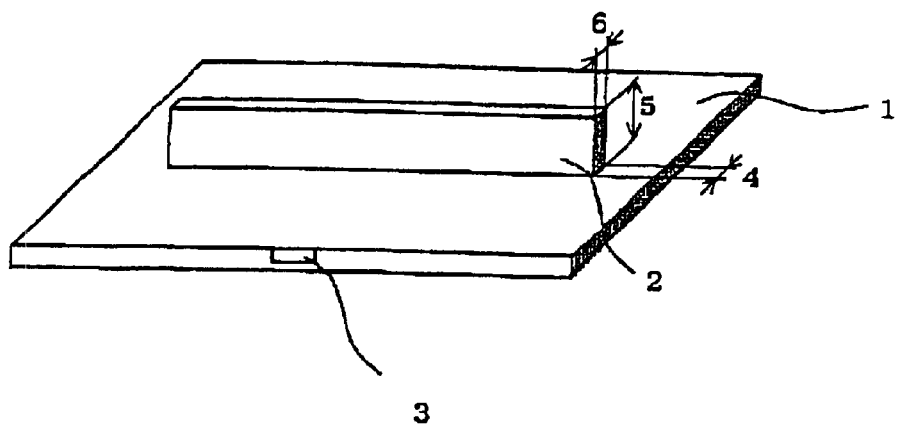
FIG. 1 is a schematic front-side perspective view of a molded product having a rib, used in Example (external dimensions: Length 178 mm×width 245 mm×thickness 2 mm).

1. Molded product having a rib.
2. Rib (basic thickness 1.2 mm, top thickness 0.6 mm, height 35 mm, length 200 mm)
3. Side gate (width 8 mm, thickness 1.5 mm)
4. Thickness of base of rib (1.2 mm)
5. Height of rib (35 mm)
6. Thickness of top of rib (0.6 mm)

EXAMPLES

The present invention will be further explained with reference to Examples hereinafter. In Examples, "% by weight" is a ratio when the total weight of Component A and Component B is 100% by weight, and "part by weight" is a ratio when the total weight of Component A and Component B is 100 parts by weight. Further, "part" stands for "part by weight". Evaluations were made on the basis of the following methods.

(1) Items of Evaluation (a) Deflection temperature under load: Measured under a load of 1.80 MPa according to ISO75.

(b) Impact value: Measured for notched Charpy impact strength according to ISO179.

(c) Flexural modulus: Measured at a testing rate of 2 mm/minute according to ISO178.

(d) Flame retardancy: Test samples having a thickness of 3.0, 2.8, 2.6, 1.6, 1.4 and 1.2 mm were subjected to a combustion test according to UL standard 94V.

(e) Appearance of molded product with a rib: Molded products having a rib shown in FIG. 1 were formed with an injection molding machine having an ultra-high speed injection device having a cylinder inner diameter of 45 mm$\phi$ (SG260M-HP, supplied by Sumitomo Heavy Industries, Ltd.) (two different injection rates of 50 mm/second and 300 mm/second), and the degree of filling in rib top ends of the molded products were visually evaluated (○ shows that the degree of filling under each of the above two conditions was excellent).

○: Completely filled

X: Resulted in short shot (f) Surface Impact Strength

A 150 mm×150 mm×2 mm (thick) plate was prepared and measured for an energy (fracture energy) and a form of fracture with a high-speed impact tester. The form of fracture shows the following.

○: Ductile fracture

X: Brittle fracture

The ductile fracture is a desirable result. As the tester, there was employed a high-speed impact tester (Hydroshot HTM-1, supplied by Shimadzu Corporation), and as test conditions, the collision rate of an impacter was set at 7 m/second, the impacter had a semi-circular top end having a radius of 6.35 mm and a receiving hole had a diameter of 25.4 mm.

(g) Hydrolysis Resistance (Surface Impact Strength)

A 150 mm×150 mm×2 mm (thick) plate-shaped molded product was treated in a constant-temperature constant-humidity vessel (PSL-2FPH, supplied by Tabai Espec Corp.) under conditions of 65° C. and 85% RH for 500 hours, and subjected to a high-speed surface impact test. The high-speed surface impact test was carried out in the same manner as in (f). A measurement result in (f) was taken as a value before the heat and humidity treatment, and strength values were compared. Further, a fracture energy retention ratio after the treatment was calculated on the basis of the following equation.

Retention ratio (%)=[Fracture energy after heat and humidity treatment (J)]/[Fracture energy before heat and humidity treatment (J)]×100 (I)

(h) Surface Scratch Resistance

A reciprocal dynamic friction abrasion tester [AFT-15-M, supplied by Tosoku Seimitsu Kogyo K.K.] was used, and a pin made of a 3 mm$\phi$ steel ball was allowed to move 40 mm on a 90 mm×50 mm×2 mm (thick) plate at a moving rate of 20 mm/second while the pin was pressed on the plate under a load of 1.8 kgf to scratch the surface. The pin was moved once in one direction. Then, the surface was measured for a scratch depth (SRv, central plane valley depth) with a surface roughness form measuring machine (SURFCOM 1400A, supplied by Tokyo Seimitsu Co., Ltd.). The value of SRv shows that with an increase in the value, the depth of a scratch increases.

(i) Measurement of Acid Value of Flame Retardant

An amount (mg) of KOH required for neutralizing the entire acid component contained in 1 g of Component B was measured according to JIS K 2501.

(j) Measurement of Half Ester of Flame Retardant

An amount ratio of half ester in Component B was calculated on the basis of GPC (gel permeation chromatography). An absorbance ratio of each component was calculated on the basis of sampled specimens. The GPC measurement employed the following. Apparatus: supplied by Waters Corporation, Column: Shodex KF-801 supplied by Showa Denko. K.K., Column temperature: 40° C., eluant: tetrahydrofuran (flow rate 0.5 ml/minute), Detector: UV 254 nm, Sample concentration: 1 mg/ml, injection amount: 10 $\mu$l.

(k) Measurement of $TiO_2$ Content

A titanium dioxide pigment used in a metal aluminum reducing method was measured for a $TiO_2$ content according to JIS K 5116.

Symbols for raw materials used in Examples are as defined below.

(Component A)

(Aromatic Polycarbonate Resin)

(1) PC-1: An aromatic polycarbonate resin powder having a viscosity average molecular weight of 22,500, obtained by a phosgene method using bisphenol A as a dihydric phenol (L-1225WP, supplied by Teijin Chemicals, Ltd.)

(2) PC-2: An aromatic polycarbonate resin powder having a viscosity average molecular weight of 28,500, obtained by a phosgene method using bisphenol A as a dihydric phenol (K-1285W, supplied by Teijin Chemicals, Ltd.)

(3) PC-3: An aromatic polycarbonate resin powder having a viscosity average molecular weight of 19,700, obtained by a phosgene method using bisphenol A as a dihydric phenol (L-1225WX, supplied by Teijin Chemicals, Ltd.)

(4) PC-4: A reactor having a stirrer and a distillation column was charged with 228 parts (about 1 mol) of 2,2-bis(4-hydroxyphenyl)propane and 223 parts (about 1.06 mol) of diphenyl carbonate and further with 0.000024 part (about $6 \times 10^{-7}$ mol/1 mol of bisphenol A) of sodium hydroxide and 0.0073 part (about $8 \times 10^{-5}$ mol/1 mol of bisphenol A) of tetramethylammonium hydroxide as catalysts, and an atmosphere in the reactor was replaced with nitrogen. The mixture was heated up to 200° C. and melted with stirring. Then, the pressure reduction degree was set at 3.99 kPa (30 Torr), and most part of phenol was distilled off under heat for 1 hour. Further, the temperature was increased up to 270° C., the pressure reduction degree was set at 0.133 kPa (1 Torr), and polymerization was carried out for 2 hours. Then, while the reaction product was in a molten state, 0.0035 part (about $6 \times 10^{-6}$ mol/1 mol of bisphenol A) of dodecylbenzene sulfonic acid tetrabutyl phosphonium salt as a catalyst neutralizer was added, and the reaction was continued at 270° C. at 1.33 kPa (10 Torr) or lower, to give aromatic polycarbonate resin pellets (PC-4) having a viscosity average molecular weight of 23,300 and having a phenolic hydroxyl group content, per 100 mol % of terminal groups, of 34 mol %.

(Polystyrene and Styrene-containing Resin)

(1) ABS-1: ABS resin (SANTAC UT-61, supplied by Nippon A & L, Inc.) having a free AS polymer content of about 80% by weight and an ABS polymer content (acetone-insoluble gel content) of about 20% by weight and having a butadiene component content, based on the entire resin, of about 12% by weight, produced by a continuous bulk polymerization method (Mitsui-Toatu method).

(2) ABS-2: ABS resin (TOYOLAC 700-314, supplied by Toray Industries, Inc.) having a free AS polymer content of about 83% by weight and an ABS polymer content (acetone-insoluble gel content) of about 17% by weight and having a butadiene component content, based on the entire resin, of about 13% by weight, produced by a continuous bulk polymerization method (Toray method).

(3) AS-1: AS resin (HF-5670, supplied by Cheil Industries, Inc.)

(4) HIPS: High-impact polystyrene resin (HT50, supplied by Idemitsu Petrochemical Co., Ltd.)

(5) MBS-1: MBS resin (METABLEN C-223A, supplied by Mitsubishi Rayon Co., Ltd.) having a core formed of a rubber component made of a butadiene polymer, the content of the butadiene polymer being 70% by weight, and a shell formed of a copolymer from methyl methacrylate and styrene, the content of the copolymer being 30% by weight.

(6) MBS-2: MBS resin (PARALOID EXL-2633, supplied by Kureha Chemical Industry Co., Ltd.) having a core formed of a rubber component made of a butadiene polymer, the content of the butadiene polymer being 80% by weight, and a shell formed of a copolymer from methyl methacrylate, ethyl acrylate and styrene, the content of the copolymer being 20% by weight.

(Polyphenylene Ether Resin)

(1) PPE: Polyphenylene ether resin (PPE: supplied by GEM)

(Component B)
(Phosphoric Ester)

(1) FR-1: Phosphoric ester flame retardant containing, as a main component, bisphenol A bis(diphenyl phosphate), obtained by the following production method.

A GL (glass-lining) reactor having a stirrer, a reflux tube and a pressure-reducible distillation device and having a heating jacket was charged with 228 parts (molar ratio 1.0) of bisphenol A, 614 parts (molar ratio 4.0) of phosphorus oxychloride and 1.425 parts (molar ratio 0.015) of anhydrous magnesium chloride, and the mixture was allowed to react under nitrogen gas current at 105° C. with stirring for 6 hours. After completion of the reaction, while the reaction mixture was temperature-increased up to 150° C. under nitrogen gas current, the pressure in the reactor was reduced to 6.68 kPa to recover unreacted phosphorus oxychloride. Then, the reactor was cooled to 100° C., 381 parts (molar ratio 4.05) of dehydrated dry phenol was supplied over 3 hours, and the mixture was heated up to 140° C. over 2 hours and further allowed to react for 1 hour. To the obtained product were added 1,250 parts of xylene and 250 parts of a 1.5% phosphoric acid aqueous solution, and a catalyst residue in the product solution was removed by washing. Further, the product solution was washed with 250 parts of water 3 times, to remove a catalyst residue. The thus-obtained solution was pressure-reduced at 175° C. at 1.33 kPa for 5 hours, for dehydration, removal of a solvent and removal of phenol, to give 770 parts of a crude phosphoric ester. Then, 1,500 parts of isopropanol was added, the mixture was heated to 80° C. and stirred to form a homogeneous solution. Then, the stirring was stopped, and while the solution was allowed to stand, the solution was allowed to cool to decrease its temperature to room temperature. After the solution was allowed to stand for 12 hours, separated isopropanol was removed, and the remainder was pressure-reduced at 80° C. at 1.33 kPa for 2 hours, to give a phosphoric ester (FR-1) containing bisphenol A bis (diphenyl phosphate) as a main component. The thus-obtained phosphoric ester as a composition was separated by liquid chromatography and its structure was identified on the basis of $^1$H-NMR, $^{13}$C-NMR and $^{31}$P-NMR. A ratio of components based on n in the general formula (I) was determined by a GPC (gel permeation chromatography) method. For an absorbance ratio of each component, the above-separated components based on n were used. The GPC measurement conditions were as follows. Apparatus: supplied by Waters Corporation, Columns: a serial connection of 1 TSKgelG2000H XL and 1 TSKgelG3000H XL, supplied by Tosoh Corporation, Column temperature: 40° C., Eluant: chloroform (flow rate 0.7 ml/minute), Detector: UV254 nm, Sample concentration: 50 mg/5 ml, injection amount: 15 $\mu$l. FR-1 had the following contents of components having condensation degrees n shown in the general formula (I). The content of a component having an n of 0 (triphenyl phosphate) was 1.5% by weight, the content of a component having an n of 1 was 94.4% by weight, the content of a component having an n of 2 was 4.0% by weight, the content of a component having an n of 3 was 0.1% by weight, and no contents having an n of more than the above were detected. Further, the weight average condensation degree N calculated without the component having an n of 0 was 1.04. Further, the above phosphoric ester flame retardant had an acid value of 0.05 mgKOH/g and a half ester content of less than 0.1% by weight (no clear peak was observed).

(2) FR-2: The above FR-1 was further subjected to distillation under reduced pressure at 260° C. at 13.3 Pa for 3 hours, to remove part of a component having an n of 0 (triphenyl phosphate), whereby FR-2 was obtained. FR-2 had the following contents of components having condensation degrees n represented by the general formula (I). The content of a component having an n of 0 (triphenyl phosphate) was 0.5% by weight, the content of a component having an n of 1 was 95.4% by weight, the content of a component having an n of 2 was 4.0% by weight, the content of a component having an n of 3 was 0.1% by weight, and no contents having an n of more than the above were detected. Further, the weight average condensation degree N calculated without the component having an n of 0 was 1.04. Further, the above phosphoric ester flame retardant had an acid value of 0.05 mgKOH/g and a half ester content of less than 0.1% by weight (no clear peak was observed).

(3) FR-3: Crude phosphoric ester prepared in the step of preparing the above FR-1. FR-3 had the following contents of components having condensation degrees n represented by the general formula (I). The content of a component having an n of 0 (triphenyl phosphate) was 2.4% by weight, the content of a component having an n of 1 was 84% by weight, the content of a component having an n of 2 was 12% by weight, the content of a component having an n of 3 was 1.5% by weight, and the content of a component having an n of 4 was 0.1% by weight. The weight average condensation degree N calculated without the component having an n of 0 was 1.16.

(4) FR-4: FR-1 and FR-3 were mixed in an FR-1:FR-3 weight ratio of 66.7:33.3, to obtain FR-4. FR-4 had the following contents of components having condensation degrees n represented by the general formula (I). The content of a component having an n of 0 (triphenyl phosphate) was 1.8% by weight, the content of a component having an n of 1 was 90.9% by weight, the content of a component having an n of 2 was 6.7% by weight, and the content of a component having an n≧3 was 0.6% by weight. The weight average condensation degree N calculated without the component having an n of 0 was 1.08.

(5) FR-5: Triphenyl phosphate having a purity of 99% was uniformly mixed with the above FR-3, to obtain FR-5 having the following composition. FR-5 had the following contents of components having condensation degrees n represented by the general formula (I). The content of a component having an n of 0 (triphenyl phosphate) was 4.5% by weight, the content of a component having an n of 1 was 82.2% by weight, the content of a component having an n of 2 was 11.7% by weight, the content of a component having an n of 3 was 1.5% by weight, and the content of a component having an n of 4 was 0.1% by weight. The weight average condensation degree N calculated without the component having an n of 0 was 1.16.

(Component C)
(Titanium Dioxide Pigment)

(1) $TiO_2$-1: Titanium dioxide ("R-TC30" supplied by "Tioxide"), average particle diameter: 0.18 μm, $Al_2O_3$ content: 3.5% by weight, $TiO_2$ content: 93% by weight)

(2) $TiO_2$-2: Titanium dioxide ("TIPAQUE PC-3" supplied by Ishihara Sangyo Kaisya Ltd., average particle diameter: 0.22 μm, $Al_2O_3$ content: 2.0% by weight, $TiO_2$ content: 91% by weight)

(3) $TiO_2$-3: Titanium dioxide ("TIPAQUE CR-63" supplied by Ishihara Sangyo Kaisya Ltd., average particle diameter: 0.22 μm, $Al_2O_3$ content: 0.8% by weight, $TiO_2$ content: 98% by weight)

(4) $TiO_2$-4: Titanium dioxide ("R-TC90" supplied by "Tioxide"), average particle diameter: 0.22 μm, $Al_2O_3$ content: 4.1% by weight, $TiO_2$ content: 94% by weight)

(5) $TiO_2$-5: Titanium dioxide ("TIPAQUE R-780" supplied by Ishihara Sangyo Kaisya Ltd., average particle diameter: 0.24 μm, $Al_2O_3$ content: 2.2% by weight, $TiO_2$ content: 88% by weight)

(6) $TiO_2$-6: Titanium dioxide ("TIPAQUE A-100" supplied by Ishihara Sangyo Kaisya Ltd., average particle diameter: 0.15 μm, $Al_2O_3$ content: 0% by weight, $TiO_2$ content: 98% by weight)

(Component D)
(Inorganic Filler)

(1) TD-1: Talc (HS-T0.8, supplied by Hayashi Kasei Co., Ltd.)

(2) TD-2: Talc (Victorylite TK-RC, supplied by Shokozan Mining Co., Ltd.)

(3) WA-1: Wollastonite (PH-450, supplied by Kawatetsu Kogyo K.K.)

(4) WA-2: Wollastonite (H-1250F, supplied by Shimizu Kogyo K.K.)

(5) GFL: Glass flakes (Microglass FLEKA REFG-301, supplied by Nippon Sheet Glass Co., Ltd.)

(6) MI: Mica (MC-250, supplied by Hayashi Kasei Co., Ltd.)

(Component E)
(Impact Modifier)

(1) MD-1: Acrylic elastomer (METABLEN W-450A, supplied by Mitsubishi Rayon Co., Ltd., a core-shell elastomer having a core formed of two rubber components made of copolymers from n-butyl acrylate and 2-ethylhexyl acrylate, the content of the 2-ethylhexyl acrylate being 35% by weight and the content of n-butyl acrylate copolymer 45% by weight, and a shell formed of a methyl methacrylate polymer, the content of the methyl methacrylate polymer being 20% by weight)

(2) MD-2: Butadiene-based elastomer (PARALOID EXL-2602, supplied by Kureha Chemical Industry Co., Ltd., a elastomer having a core formed of a rubber component made of a butadiene polymer, the content of the butadiene polymer being 80% by weight, and a shell formed of a copolymer from 16% by weight of methyl methacrylate and 4% by weight of ethyl acrylate)

(Mold Release Agent)

(1) ML: Saturated fatty acid ester mold release agent (RIKEMAL SL900, supplied by Riken Vitamin Co., Ltd.)

(Colorant)

(1) PI: Ivory-colored colorant master (a mixture of a dye, a pigment, carbon black, $TiO_2$-1 and PC-1 in the following (i) to (v). The colorant master was uniformly mixed with a super mixer to prepare a dry color master, and then it was mixed with other raw materials. Parenthesized values by % by weight are ratios based on PI=100% by weight.
  (i) PC-1 (49.89% by weight)
  (ii) $TiO_2$-1 (50.00% by weight)
  (iii) CB970 (0.085% by weight) (Carbon black, CARBON BLACK #970, supplied by Mitsubishi Chemical Corporation)
  (iv) Y8050 (0.005% by weight) (Plast Yellow Y8050, supplied by Arimoto Chemical Co., Ltd.: quinoline dye containing no halogen atom)
  (v) R9370 (0.02% by weight) (Plast Red R9370, supplied by Arimoto Chemical Co., Ltd.)

(Carbon Black)

(1) CB: Carbon black (Furnace Black MA-100, pH=3.5, supplied by Mitsubishi Chemical Corporation)

(Acid-modified Olefin Wax as a Breaking Inhibitor)

(1) DC: Copolymer wax of maleic anhydride and α-olefin (Diacarna PA30M, supplied by Mitsubishi Chemical Corporation, maleic anhydride content; about 1 meq/g, weight average molecular weight calculated as a standard polystyrene and based on measurement by GPC method; about 8,400).

(Component F)
(Fluorine-Containing Compound)

(1) PTFE: Polytetrafluoroethylene having fibril formability (POLYFLON MPA FA-500, supplied by Daikin Industries Ltd.)

Examples 1 to 16 and Comparative Examples 1 to 8

A thermoplastic resin, a flame retardant, titanium dioxide and PTFE for forming a composition shown in Table 1 or 2 were melt-kneaded with a vented twin-screw extruder (TEX-30XSST, supplied by The Japan Steel Works, Ltd.), and pellets were obtained. In addition, the titanium dioxide was uniformly mixed with a polycarbonate resin (PC-1) or a polyphenylene ether resin with a super mixer in advance so that the titanium dioxide content came to be 10% by weight, to obtain a preliminary mixture (i) of titanium dioxide and a thermoplastic resin. Similarly, PTFE was uniformly mixed with a polycarbonate resin (PC-1) or a polyphenylene ether resin in advance so that the PTFE content came to be 2.5% by weight, to obtain a mixture (ii) of PTFE and a thermoplastic resin. The thermoplastic resin and the mixtures (i) and (ii) were fed to a first feed port positioned near the base of the screws and melt-kneaded at a screw rotation rate of 180 rpm, at a vent suction degree of 3,000 Pa and at a discharge rate of 15 kg/hour. The flame retardant (Component B) was heated to 80° C. and fed in the form of a liquid, to a block between a side feeder and a vent discharge port with a liquid injection device (HYM-JS-08, supplied by Fuji Techno Kogyo K.K.). The extrusion temperature was set at 280° C. when polycarbonate resins alone were used as the thermoplastic resin, and it was set at 260° C. in any other cases. The thus-obtained pellets were dried at 100° C. with a hot air dryer for 5 hours, and then injection-molded with an injection molding machine (SG-150U, supplied by Sumitomo Heavy Industries, Ltd.) to obtain predetermined test pieces for evaluations. The molding conditions included a cylinder temperature of 280° C. and a mold temperature of 80° C. when polycarbonate resins alone were used as the thermoplastic resin, and they included a cylinder temperature of 260° C. and a mold temperature of 60° C. in any other cases. Tables 1 and 2 show the results.

TABLE 1

| | | Unit | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 | Ex. 15 | Ex. 16 |
|---|---|---|---|---|---|---|---|---|---|---|---|---|---|---|---|---|---|---|
| Component A | PC-1 | Wt % | 92 | 85 | 85 | 92 | 85 | 70 | 68 | 70 | 68 | | 70 | 70 | 70 | 70 | 70 | 70 |
| | ABS-1 | Wt % | | | | | | 15 | 15 | 15 | 15 | | 15 | 15 | 15 | 15 | 15 | 15 |
| | PPE | Wt % | | | | | | | | | | 60 | | | | | | |
| | HIPS | Wt % | | | | | | | | | | 25 | | | | | | |
| Component B | FR-1 | Wt % | 8 | 15 | | | | 15 | 17 | | | 15 | 15 | 15 | 15 | 15 | 15 | 15 |
| | FR-2 | Wt % | | | 15 | | | | | | | | | | | | | |
| | FR-4 | Wt % | | | | 8 | 15 | | | 15 | 17 | | | | | | | |
| Component C | $TiO_2$-1 | Part by weight | | | | | | | | | | | 1 | | | | | |
| | $TiO_2$-2 | Part by weight | | | | | | | | | | | | 1 | | | | |
| | $TiO_2$-3 | Part by weight | | | | | | | | | | | | | 1 | | | |
| | $TiO_2$-4 | Part by weight | | | | | | | | | | | | | | 1 | | |
| | $TiO_2$-5 | Part by weight | | | | | | | | | | | | | | | 1 | |
| | $TiO_2$-6 | Part by weight | | | | | | | | | | | | | | | | 1 |
| Component F | PTFE | Part by weight | | | | | | | | 0.3 | | | 0.3 | 0.3 | 0.3 | 0.3 | 0.3 | 0.3 |
| Flame retardancy | Evaluation at thickness of 3.0 mm | — | V-0 | V-0 | V-0 | V-0 | V-0 | V-0 | V-1 | V-1 | V-1 | V-0 | V-0 | V-0 | V-0 | V-0 | V-0 | V-0 |
| | Evaluation at thickness of 2.8 mm | — | V-1 | V-1 | V-1 | V-1 | V-1 | V-0 | V-1 | V-2 | V-1 | V-1 | V-0 | V-0 | V-0 | V-0 | V-0 | V-0 |
| | Evaluation at thickness of 2.6 mm | — | V-2 | V-1 | V-1 | V-2 | V-1 | V-0 | V-2 | V-2 | V-2 | V-2 | V-0 | V-0 | V-0 | V-0 | V-1 | V-1 |
| | Average combustion time period | Second | 4.2 | 3.1 | 1.9 | 6.3 | 5.5 | 4.2 | 7.1 | 9.1 | 10.2 | 5.7 | 5.8 | 6.9 | 7.1 | 7.5 | 7.1 | 9.8 |
| | Number of flaming drips | Drips | 2 | 0 | 0 | 3 | 0 | 0 | 3 | 5 | 4 | 3 | 0 | 0 | 0 | 0 | 0 | 0 |
| Charpy impact strength | | $kJ/m^2$ | 12 | 10 | 11 | 10 | 7 | 17 | 13 | 16 | 9 | 7 | 17 | 16 | 16 | 16 | 15 | 12 |
| Deflection temperature under load | | °C. | 97 | 82 | 84 | 94 | 80 | 80 | 76 | 79 | 75 | 77 | 81 | 80 | 80 | 79 | 79 | 77 |
| Flexural modulus | | MPa | 2780 | 2920 | 2940 | 2670 | 2830 | 2890 | 2950 | 2880 | 2900 | 2890 | 2890 | 2890 | 2890 | 2900 | 2890 | 2920 |
| Surface impact strength (fracture form, energy) | | J | ○24 | X15 | X17 | ○22 | X10 | ○21 | X15 | ○18 | X13 | X9 | ○21 | ○20 | ○20 | ○20 | ○17 | X14 |
| Hydrolysis resistance | Surface impact strength (fracture form, energy) | J | ○20 | X11 | X13 | ○18 | X7 | X15 | X11 | X12 | X9 | X6 | X19 | X17 | X17 | X17 | X9 | X10 |
| | Retention ratio | % | 84 | 74 | 76 | 83 | 72 | 71 | 70 | 68 | 70 | 67 | 91 | 87 | 86 | 86 | 56 | 71 |

Ex. = Example

TABLE 2

| | | Unit | C.Ex. 1 | C.Ex. 2 | C.Ex. 3 | C.Ex. 4 | C.Ex. 5 | C.Ex. 6 | C.Ex. 7 | C.Ex. 8 |
|---|---|---|---|---|---|---|---|---|---|---|
| Component A | PC-1 | Wt % | 92 | 85 | 70 | 68 | | 100 | 85 | 70 |
| | ABS-1 | Wt % | | | 15 | 15 | | | | 15 |
| | PPE | Wt % | | | | | 60 | | | |
| | HIPS | Wt % | | | | | 25 | | | |
| Component B | FR-3 | Wt % | 8 | 15 | 15 | 17 | 15 | | 15 | 15 |
| Component C | $TiO_2$-5 | Wt % | | | | | | | 1 | |
| | $TiO_2$-6 | Wt % | | | | | | | | 1 |
| Component F | PTFE | Wt % | | | 0.3 | | | | | 0.3 |
| Flame retardancy | Evaluation at thickness of 3.0 mm | — | V-0 | V-0 | V-0 | V-1 | V-0 | V-0 | | |
| | Evaluation at thickness of 2.8 mm | — | V-2 | V-1 | V-0 | V-1 | V-1 | notV | V-1 | V-1 |
| | Evaluation at thickness of 2.6 mm | — | notV | V-2 | V-1 | notV | notV | notV | V-2 | V-1 |

TABLE 2-continued

|  |  | Unit | C.Ex. 1 | C.Ex. 2 | C.Ex. 3 | C.Ex. 4 | C.Ex. 5 | C.Ex. 6 | C.Ex. 7 | C.Ex. 8 |
|---|---|---|---|---|---|---|---|---|---|---|
|  | Average combustion time period | Second | 9.5 | 6.7 | 14.2 | 10.8 | 11.4 | 12.8 | 8.6 | 18.1 |
|  | Number of flaming drips | Drips | 2 | 1 | 0 | 3 | 4 | 4 | 2 | 0 |
| Charpy impact strength |  | kJ/m² | 8 | 5 | 10 | 6 | 5 | 70 | 7 | 9 |
| Deflection temperature under load |  | ° C. | 94 | 80 | 77 | 74 | 74 | 128 | 78 | 76 |
| Flexural modulus |  | MPa | 2710 | 2830 | 2800 | 2890 | 2810 | 2350 | 2850 | 2820 |
| Surface impact strength (fracture form, energy) |  | J | ○20 | X7 | X8 | X7 | X5 | ○35 | X6 | X7 |
| Hydrolysis resistance | Surface impact strength (fracture form, energy) | J | X13 | X4 | X5 | X4 | X3 | ○33 | X2 | X5 |
|  | Retention ratio | % | 66 | 58 | 59 | 55 | 60 | 94 | 33 | 71 |

C.Ex. = Comparative Example

Examples 17 to 34 and Comparative Examples 9 to 14

(i) A mixture prepared by uniformly mixing titanium dioxide (TiO₂), a mold release agent (ML), a colorant (PI), carbon black (CB), a stabilizer (ST) and a wax (DC) with PC-1, PC-2, PC-3 or PC-4 (pulverized) in an amount approximately 10 times greater than the total amount of the above additives with a super mixer, (ii) a mixture prepared by mixing PC-1, PC-2, PC-3 or PC-4 (pulverized) with PTFE as Component C such that the total amount was 2.5% by weight, and (iii) a remaining Component A were homogeneously mixed with a tumbler for forming a composition shown in Table 3 or 4. The thus-prepared mixture was fed to a first feed port positioned near the base of screws of an extruder. When the mixture contained a reinforcement, the mixture was fed through a second feed port with using a side feeder. Phosphoric ester was heated at 80° C. and fed in the form of a liquid, to a block between the side feeder and a vent discharge port with a liquid injection device (HYM-JS-08, supplied by Fuji Techno Industries Co., Ltd.). The liquid injection device was set so that a constant amount was supplied, and the other raw materials to be fed were measured for accurate amounts with a weighing machine (CWF, supplied by Kubota Corporation). As the extruder, a vented twin-screw extruder having a diameter of 30 mmφ (TEX-30XSST, supplied by The Japan Steel Works, Ltd.) was used. The extrusion temperature was set at 280° C. when polycarbonate resins alone were used as a thermoplastic resin, and it was set at 260° C. in other cases. The thus-obtained pellets were dried at 100° C. with a hot air dryer for 5 hours, and then injection-molded with an injection molding machine (SG-150U, supplied by Sumitomo Heavy Industries, Ltd.) at a cylinder temperature of 280° C. and at a mold temperature of 80° C. when polycarbonate resins alone were used as a thermoplastic resin, or at a cylinder temperature of 260° C. and at a mold temperature of 60° C. in other cases, to obtain predetermined test pieces for evaluations. Molded articles with a rib were formed by molding at a cylinder temperature of 280° C. and at a mold temperature of 80° C. when polycarbonate resins alone were used as a thermoplastic resin, or at a cylinder temperature of 260° C. and at a mold temperature of 60° C. in other cases, and further at the aforementioned two injection rates at a dwell pressure of 40 MPa for a dwell time of 3.0 seconds and for a cooling time of 30 seconds. Such molded articles were visually evaluated for a degree of fullness of a rib end each. Tables 3 and 4 show the results.

TABLE 3

|  |  | Unit | Ex. 17 | Ex. 18 | Ex. 19 | Ex. 20 | Ex. 21 | Ex. 22 | CEx. 9 | CEx. 10 | CEx. 11 | CEx. 12 |
|---|---|---|---|---|---|---|---|---|---|---|---|---|
| Component A | PC-1 | Wt % | 92 | 70 | 68 | 68 | 92 |  | 92 | 70 | 68 | 68 |
|  | ABS-1 | Wt % |  | 17 |  |  |  |  |  | 17 |  |  |
|  | ABS-2 | Wt % |  |  | 16 | 16 |  |  |  |  | 16 | 16 |
|  | MBS-1 | Wt % |  |  | 3 |  |  |  |  |  | 3 |  |
|  | MBS-2 | Wt % |  |  |  | 3 |  |  |  |  |  | 3 |
|  | PPE | Wt % |  |  |  |  |  | 60 |  |  |  |  |
|  | HIPS | Wt % |  |  |  |  |  | 25 |  |  |  |  |
| Component B | FR-1 | Wt % | 8 | 13 | 13 | 13 |  | 15 |  |  |  |  |
|  | FR-4 | Wt % |  |  |  |  | 8 |  |  |  |  |  |
|  | FR-5 | Wt % |  |  |  |  |  |  | 8 | 13 | 13 | 13 |
| Component C | TiO₂-1 | Part by weight |  | 1 | 1 | 1 |  |  |  | 1 | 1 | 1 |
| Component E | MD-1 | Part by weight |  | 3 |  |  |  |  |  | 3 |  |  |
|  | MD-2 | Part by weight |  |  |  |  |  |  |  |  |  |  |
|  | ML | Part by weight | 0.3 | 0.3 | 0.3 | 0.3 | 0.3 | 0.3 | 0.3 | 0.3 | 0.3 | 0.3 |
|  | CB | Part by weight | 0.1 |  |  |  | 0.1 | 0.1 | 0.1 |  |  |  |
| Component F | PTFE | Part by weight | 0.4 | 0.4 | 0.4 | 0.4 | 0.4 | 0.4 | 0.4 | 0.4 | 0.4 | 0.4 |
| Flame retardancy | Evaluation at thickness of 1.6 mm | — | V-0 | V-0 | V-0 | V-0 | V-0 | V-0 | V-0 | V-0 | V-0 | V-0 |
|  | Evaluation at thickness of 1.4 mm | — | V-0 | V-0 | V-0 | V-0 | V-0 | V-0 | V-0 | V-0 | V-0 | V-0 |
|  | Evaluation at thickness of 1.2 mm | — | V-0 | V-0 | V-0 | V-0 | V-0 | V-0 | V-1 | V-1 | V-1 | V-1 |
|  | Average combustion time period | Second | 3.1 | 8.7 | 7.6 | 6.8 | 4.9 | 3.7 | 7.6 | 13.5 | 12.2 | 10.6 |
|  | Number of flaming drips | Drips | 0 | 0 | 0 | 0 | 0 | 0 | 0 | 0 | 0 | 0 |
| Charpy impact strength |  | kJ/m² | 10 | 25 | 26 | 27 | 8 | 10 | 5 | 21 | 22 | 23 |
| Deflection temperature under load |  | ° C. | 96 | 83 | 84 | 83 | 97 | 74 | 94 | 81 | 82 | 81 |
| Flexural modulus |  | MPa | 2770 | 2580 | 2560 | 2570 | 2770 | 2800 | 2750 | 2550 | 2550 | 2560 |
| Surface impact strength (fracture form, energy) |  | J | ○23 | ○28 | ○31 | ○29 | ○22 | X9 | ○19 | ○21 | ○21 | ○22 |

TABLE 3-continued

|  |  | Unit | Ex. 17 | Ex. 18 | Ex. 19 | Ex. 20 | Ex. 21 | Ex. 22 | CEx. 9 | CEx. 10 | CEx. 11 | CEx. 12 |
|---|---|---|---|---|---|---|---|---|---|---|---|---|
| Hydrolysis resistance | Surface impact strength (fracture form, energy) | J | ○19 | ○25 | ○29 | ○27 | ○17 | X7 | ○13 | ○14 | ○14 | ○14 |
|  | Retention ratio | % | 83 | 91 | 93 | 92 | 77 | 78 | 69 | 68 | 66 | 65 |
| Appearance of molded article with rib |  | — | ○ | ○ | ○ | ○ | ○ | ○ | X | X | X | X |

Ex. = Example,
C. Ex. = Comparative Example

TABLE 4

|  |  | Unit | Ex. 23 | Ex. 24 | Ex. 25 | Ex. 26 | Ex. 27 | Ex. 28 | Ex. 29 | Ex. 30 | Ex. 31 | Ex. 32 | Ex. 33 | Ex. 34 | C.Ex. 13 | C.Ex. 14 |
|---|---|---|---|---|---|---|---|---|---|---|---|---|---|---|---|---|
| Component A | PC-1 | Wt % | 68 |  | 68 | 66 |  | 68 | 66 |  | 66 | 72 | 72 |  | 71 | 68 |
|  | PC-2 | Wt % |  | 68 |  |  |  |  |  |  |  |  |  |  |  |  |
|  | PC-3 | Wt % |  |  |  |  | 66 |  |  |  |  |  |  |  |  |  |
|  | PC-4 | Wt % |  |  |  |  |  |  |  | 66 |  |  |  |  |  |  |
|  | ABS-2 | Wt % | 16 | 16 | 16 | 16 | 16 | 16 | 16 | 16 | 16 |  |  |  | 16 | 16 |
|  | AS | Wt % |  |  |  |  |  |  |  |  |  | 15 | 15 |  |  |  |
|  | MBS-1 | Wt % | 3 | 3 | 3 | 3 | 3 | 3 | 3 | 3 | 3 |  |  |  |  | 3 |
|  | PPE | Wt % |  |  |  |  |  |  |  |  |  |  |  | 60 |  |  |
|  | HIPS | Wt % |  |  |  |  |  |  |  |  |  |  |  | 25 |  |  |
| Component B | FR-1 | Wt % | 13 | 13 | 13 | 15 | 15 | 13 | 15 | 15 | 15 | 13 | 13 | 15 |  |  |
|  | FR-3 | Wt % |  |  |  |  |  |  |  |  |  |  |  |  | 13 | 13 |
| Component C | TiO₂-1 | Part by weight |  | 1 |  |  |  |  | 1 | 1 |  |  |  |  |  |  |
| Component D | TD-1 | Part by weight | 5 |  |  |  |  |  |  |  |  |  |  |  | 5 |  |
|  | TD-2 | Part by weight |  | 5 |  |  |  |  |  |  |  |  |  |  |  |  |
|  | WA-1 | Part by weight |  |  |  |  |  | 5 |  |  |  |  |  |  |  | 5 |
|  | WA-2 | Part by weight |  |  |  |  |  |  | 5 | 5 | 5 |  |  |  |  |  |
|  | GFL | Part by weight |  |  |  |  |  |  |  |  |  | 10 |  | 30 |  |  |
|  | MI | Part by weight |  |  |  |  |  |  |  |  |  |  | 30 |  |  |  |
| Component E | DC | Part by weight | 0.4 |  | 0.4 | 0.4 | 0.4 | 0.4 | 0.4 | 0.4 | 0.4 |  |  |  | 0.4 | 0.4 |
|  | ML | Part by weight |  | 0.3 |  |  |  |  |  |  |  |  |  |  |  |  |
|  | PI | Part by weight |  |  |  | 2 | 2 |  |  |  | 2 |  |  |  |  |  |
|  | CB | Part by weight | 0.5 |  |  |  |  |  |  |  |  | 0.5 | 0.5 | 0.5 | 0.5 |  |
| Component F | PTFE | Part by weight | 0.4 | 0.4 | 0.4 | 0.4 | 0.4 | 0.4 | 0.4 | 0.4 | 0.4 |  |  |  | 0.4 | 0.4 |
| Flame retardency | Evaluation at thickness of 1.6 mm | — | V-0 | V-0 | V-0 | V-0 | V-0 | V-0 | V-0 | V-0 | V-0 | V-0 | V-0 | V-0 | V-0 | V-0 |
|  | Evaluation at thickness of 1.4 mm | — | V-0 | V-0 | V-0 | V-0 | V-0 | V-0 | V-0 | V-0 | V-0 | V-1 | V-1 | V-1 | V-0 | V-0 |
|  | Evaluation at thickness of 1.2 mm | — | V-0 | V-0 | V-0 | V-0 | V-0 | V-0 | V-0 | V-0 | V-0 | V-1 | V-1 | V-1 | V-1 | V-1 |
|  | Average combustion time period | Second | 3.3 | 3.1 | 7.7 | 7.8 | 8.3 | 2.2 | 1.9 | 2.0 | 1.7 | 9.8 | 8.8 | 9.5 | 7.9 | 9.1 |
|  | Number of flaming drips | Drips | 0 | 0 | 0 | 0 | 0 | 0 | 0 | 0 | 0 | 0 | 0 | 0 | 0 | 0 |
| Charpy impact strength |  | kJ/m² | 22 | 25 | 26 | 25 | 20 | 25 | 25 | 24 | 26 | 8 | 7 | 6 | 18 | 19 |
| Deflection temperature under load |  | ° C. | 82 | 82 | 83 | 78 | 78 | 83 | 79 | 79 | 79 | 87 | 87 | 78 | 81 | 81 |
| Flexural modulus |  | MPa | 3050 | 3070 | 2550 | 2550 | 2580 | 3300 | 3350 | 3340 | 3350 | 4520 | 7500 | 7430 | 3050 | 3200 |
| Surface impact strength (fracture form, energy) |  | J | ○30 | ○31 | ○32 | ○32 | ○27 | ○28 | ○28 | ○28 | ○29 | X8 | X6 | X6 | ○27 | ○28 |
| Hydrolysis resistance | Surface impact strength (fracture form, energy) | J | ○27 | ○28 | ○28 | ○29 | ○24 | ○25 | ○26 | ○26 | ○27 | X7 | X5 | X5 | ○18 | ○18 |
|  | Retention ratio | % | 90 | 90 | 87 | 90 | 90 | 90 | 94 | 93 | 94 | 88 | 83 | 83 | 67 | 65 |
| Appearance of molded article with rib |  | — | ○ | ○ | ○ | ○ | ○ | ○ | ○ | ○ | ○ | ○ | ○ | ○ | X | X |
| Depth of scratch |  | μm | 0.44 | 0.45 | 0.21 | 0.21 | 0.21 | 0.23 | 0.23 | 0.23 | 0.22 | 0.26 | 0.76 | 0.24 | 0.43 | 0.24 |

Ex. = Example,
C.Ex. = Comparative Example

As is clear from the above results, the flame-retardant resin composition of the present invention is excellent in flame retardancy in the form of a product having a small wall thickness, and has excellent properties in impact resistance. Further, the flame-retardant resin composition of the present invention gives molded articles having an excellent appearance even when the molded articles have a tall rib and a large size, so that it can be seen that the flame-retardant resin composition is a resin composition suitable for forming molded articles having a large size and a small wall thickness. It is seen that even resin compositions having insufficient flowability can give molded articles having a small wall thickness, and that the molded articles can be therefore further improved in impact resistance. Further, it can be seen that the flame-retardant resin composition of the present invention is excellent in hydrolysis resistance during coloring, and has surface properties suitable for large-sized molded articles having a small wall thickness and excellent appearance without coating.

Effect of the Invention

The resin composition of the present invention has excellent flame retardancy, especially, excellent retardancy in the form of a molded product having a small wall thickness, and has good impact resistance, and further, it is suitable for forming a large-sized molded product having a small wall thickness which requires rigidity and surface properties, so that it can be widely applied to the fields of electric and electronic machines and equipment, OA machines and equipment, automobiles, and the like. The resin composition of the present invention therefore produces industrially remarkable effects.

What is claimed is:

1. A flame-retardant resin composition comprising
   (A) (1) a resin component (Component A-1) containing 50 to 100% by weight of an aromatic polycarbonate resin and 0 to 50% by weight of a styrene-containing resin or (2) a resin component (Component A-2) containing 20 to 80% by weight of a polyphenylene ether resin and 80 to 20% by weight of a polystyrene, provided that Component A-1 or Component A-2 will be referred to as Component A, and
   (B) a flame retardant (Component B) that is a phosphoric ester of the following formula (I), the phosphoric ester containing, per 100% by weight thereof, 3% by weight or less of a component having a condensation degree n of 0, 86.5 to 98.5% by weight of a component having a condensation degree n of 1, 1 to 9% by weight of a component having a condensation degree n of 2 and 1.5% by weight or less of a component having a condensation degree n of ≧3, and having a weight average condensation degree N in the range of 1.01 to 1.10 when the weight average condensation degree N is calculated without the component having a condensation degree n of 0,
   the flame-retardant resin composition containing, per 100% by weight of the total of Component A and Component B, 65 to 99% by weight of.Component A and 1 to 35% by weight of Component B,

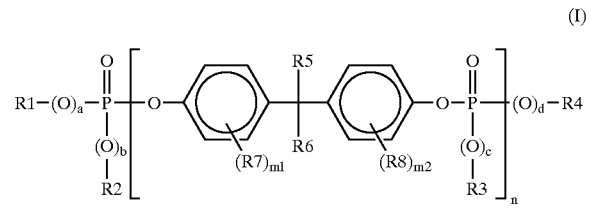
(I)

wherein each of R1, R2, R3 and R4 is independently an aryl group having 6 to 12 carbon atoms, each of R5 and R6 is independently methyl or a hydrogen atom, each of R7 and R8 is methyl, m1 and m2 are 0 or integers of 1 or 2, each of a, b, c and d is independently 0 or 1, and n is 0 or an integer of 1 to 5.

2. The flame-retardant resin composition of claim 1, wherein said phosphoric ester (Component B) contains, per 100% by weight thereof, 2.5% by weight or less of a component having a condensation degree n of 0, 89.5 to 98.5% by weight of a component having a condensation degree n of 1, 1 to 7% by weight of a component having a condensation degree n of 2 and 1% by weight or less of a component having a condensation degree n of ≧3, and has a weight average condensation degree N in the range of 1.01 to 1.09 when the weight average condensation degree N is calculated without the component having a condensation degree n of 0.

3. A flame-retardant resin composition comprising
   (A) a resin component (Component A-1) containing 50 to 100% by weight of an aromatic polycarbonate resin and 0 to 50% by weight of a styrene-containing resin, and
   (B) a flame retardant (Component B) that is a phosphoric ester of the following formula (I), the phosphoric ester containing, per 100% by weight thereof, 3% by weight or less of a component having a condensation degree n of 0, 86.5 to 98.5% by weight of a component having a condensation degree n of 1, 1 to 9% by weight of a component having a condensation degree n of 2 and 1.5% by weight or less of a component having a condensation degree n of ≧3, and having a weight average condensation degree N in the range of 1.01 to 1.10 when the weight average condensation degree N is calculated without the component having a condensation degree n of 0,
   the flame-retardant resin composition containing, per 100% by weight of the total of Component A-1 and Component B, 65 to 99% by weight of Component A-1 and 1 to 35% by weight of Component B,

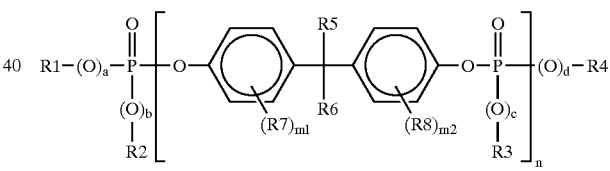
(I)

wherein each of R1, R2, R3 and R4 is independently an aryl group having 6 to 12 carbon atoms, each of R5 and R6 is independently methyl or a hydrogen atom, each of R7 and R8 is methyl, m1 and m2 are 0 or integers of 1 or 2, each of a, b, c and d is independently 0 or 1, and n is 0 or an integer of 1 to 5.

4. The flame-retardant resin composition of claim 3, wherein said phosphoric ester (Component B) contains, per 100% by weight thereof, 2.5% by weight or less of a component having a condensation degree n of 0, 89.5 to 98.5% by weight of a component having a condensation degree n of 1, 1 to 7% by weight of a component having a condensation degree n of 2 and 1% by weight or less of a component having a condensation degree n of ≧3, and has a weight average condensation degree N in the range of 1.01 to 1.09 when the weight average condensation degree N is calculated without the component having a condensation degree n of 0.

5. The flame-retardant resin composition of claim 3, wherein the resin component (Component A-1) contains 70 to 95% by weight of an aromatic polycarbonate resin and 5 to 30% by weight of a styrene-containing resin.

6. The flame-retardant resin composition of claim 3, wherein the styrene-containing resin is at least one member selected from the group consisting of a polystyrene resin (PS resin), an MS resin, an ABS resin, an AS resin, an AES resin, an ASA resin, an MBS resin, an MABS resin, an MAS resin, an SMA resin, an SBS resin and an SIS resin.

7. The flame-retardant resin composition of claim 3, which contains, per 100% by weight of the total of the resin component (Component A-1) and Component B, 75 to 98% by weight of the resin component (Component A-1) and 2 to 25% by weight of Component B.

8. A flame-retardant resin composition containing
(A) Component A-1 as a resin component,
(B) Component B as a flame retardant,
(C) titanium dioxide (Component C) as a pigment, and
(F) a fluorine-containing compound (Component F) as a dripping preventer,
(i) the resin composition containing, per 100% by weight of the total of Component A-1 and Component B, 65 to 99% by weight of Component A-1 and 1 to 35% by weight of Component B, and (ii) the resin composition containing, per 100 parts by weight of the total of Component A-1 and Component B, 0.05 to 10 parts by weight of Component C and 0 to 5 parts by weight of Component F.

9. A flame-retardant resin composition containing
(A) Component A-1 as a resin component,
(B) Component B as a flame retardant,
(D) an inorganic filler (Component D) as a reinforcement, and
(F) a fluorine-containing compound (Component F) as a dripping preventer,
(i) the resin composition containing, per 100% by weight of the total of Component A-1 and Component B, 65 to 99% by weight of Component A-1 and 1 to 35% by weight of Component B, and (ii) the resin composition containing, per 100 parts by weight of the total of Component A-1 and Component B, 1 to 100 parts by weight of Component D and 0 to 5 parts by weight of Component F.

10. A flame-retardant resin composition containing
(A) Component A-1 as a resin component,
(B) Component B as a flame retardant,
(C) titanium dioxide (Component C) as a pigment,
(D) an inorganic filler (Component D) as a reinforcement,
(E) other additive (Component E), and
(F) a fluorine-containing compound (Component F) as a dripping preventer,
(i) the resin composition containing, per 100% by weight of the total of Component A-1 and Component B, 65 to 99% by weight of Component A-1 and 1 to 35% by weight of Component B, and (ii) the resin composition containing, per 100 parts by weight of the total of Component A-1 and Component B, 0.08 to 10 parts by weight of Component C, 1 to 100 parts by weight of Component D, 0 to 10 parts by weight of Component E and 0 to 5 parts by weight of Component F.

11. The flame-retardant resin composition of claim 8, 9 or 10, wherein said phosphoric ester (Component B) contains, per 100% by weight thereof, 2.5% by weight or less of a component having a condensation degree n of 0, 89.5 to 98.5% by weight of a component having a condensation degree n of 1, 1 to 7% by weight of a component having a condensation degree n of 2 and 1% by weight or less of a component having a condensation degree n of $\geq 3$, and has a weight average condensation degree N in the range of 1.01 to 1.09 when the weight average condensation degree N is calculated without the component having a condensation degree n of 0.

12. The flame-retardant resin composition of claim 8, 9 or 10, wherein the resin component (Component A-1) contains 70 to 95% by weight of an aromatic polycarbonate resin and 5 to 30% by weight of a styrene-containing resin.

13. The flame-retardant resin composition of claim 8, 9 or 10, wherein the styrene-containing resin is at least one member selected from the group consisting of a polystyrene resin (PS resin), an MS resin, an ABS resin, an AS resin, an AES resin, an ASA resin, an MBS resin, an MABS resin, an MAS resin, an SMA resin, an SBS resin and an SIS resin.

14. The flame-retardant resin composition of claim 8, 9 or 10, which contains, per 100% by weight of the total of the resin component (Component A-1) and Component B, 75 to 98% by weight of the resin component (Component A-1) and 2 to 25% by weight of Component B.

15. The flame-retardant resin composition of claim 8 or 10, wherein the titanium dioxide (Component C) has a $TiO_2$ content of 89 to 98% by weight and a $Al_2O_3$ content of 0.5 to 4.5% by weight, the $Al_2O_3$ being a surface-treating agent.

16. The flame-retardant resin composition of claim 8 or 10, wherein the titanium dioxide (Component C) is contained in an amount of 0.1 to 5 parts by weight per 100 parts by weight of total of the resin component (Component A-1) and Component B.

17. The flame-retardant resin composition of claim 8, 9 or 10, wherein the fluorine-containing compound (Component F) is contained in an amount of 0.01 to 1 part by weight per 100 parts by weight of total of the resin component (Component A-1) and Component B.

18. The flame-retardant resin composition of claim 9 or 10, wherein the inorganic filler (Component D) is at least one member selected from the group consisting of talc, mica, wollastonite, a glass fiber, a glass milled fiber and glass flakes.

19. The flame-retardant resin composition of claim 9 or 10, wherein the inorganic filler (Component D) is contained in an amount of 1 to 50 parts by weight per 100 parts by weight of total of the resin component (Component A-1) and Component B.

20. A flame-retardant resin composition comprising
(A) a resin component (Component A-2) containing 20 to 80% by weight of a polyphenylene ether resin and 80 to 20% by weight of a polystyrene, and
(B) a flame retardant (Component B) that is a phosphoric ester of the following formula (I), the phosphoric ester containing, per 100% by weight thereof, 3% by weight or less of a component having a condensation degree n of 0, 86.5 to 98.5% by weight of a component having a condensation degree n of 1, 1 to 9% by weight of a component having a condensation degree n of 2 and 1.5% by weight or less of a component having a condensation degree n of $\geq 3$, and having a weight average condensation degree N in the range of 1.01 to 1.10 when the weight average condensation degree N is calculated without the component having a condensation degree n of 0,
the flame-retardant resin composition containing, per 100% by weight of the total of Component A-2 and Component B, 65 to 99% by weight of Component A-2 and 1 to 35% by weight of Component B,

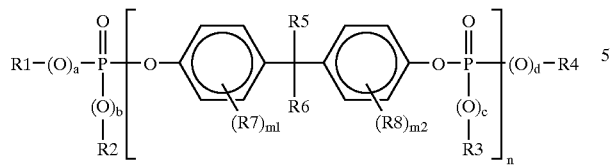

(I)

wherein each of R1, R2, R3 and R4 is independently an aryl group having 6 to 12 carbon atoms, each of R5 and R6 is independently methyl or a hydrogen atom, each of R7 and R8 is methyl, m1 and m2 are 0 or integers of 1 or 2, each of a, b, c and d is independently 0 or 1, and n is 0 or an integer of 1 to 5.

21. The flame-retardant resin composition of claim 20, wherein said phosphoric ester (Component B) contains, per 100% by weight thereof, 2.5% by weight or less of a component having a condensation degree n of 0, 89.5 to 98.5% by weight of a component having a condensation degree n of 1, 1 to 7% by weight of a component having a condensation degree n of 2 and 1% by weight or less of a component having a condensation degree n of $\geqq 3$, and has a weight average condensation degree N in the range of 1.01 to 1.09 when the weight average condensation degree N is calculated without the component having a condensation degree n of 0.

22. The flame-retardant resin composition of claim 20, wherein the resin component (Component A-2) contains 25 to 70% by weight of a polyphenylene ether resin and 75 to 30% by weight of a polystyrene.

23. A flame-retardant resin composition containing (A) Component A-2 as a resin component (B) Component B as a flame retardant, and (C) titanium dioxide as a pigment (Component C), (i) the resin composition containing, per 100% by weight of the total of Component A-2 and Component B, 65 to 99% by weight of Component A-2 and 1 to 35% by weight of Component B, and (ii) the resin composition containing, per 100 parts by weight of the total of Component A-2 and Component B, 0.05 to 10 parts by weight of Component C.

24. A flame-retardant resin composition containing (A) Component A-2 as a resin component (B) Component B as a flame retardant, and (D) an inorganic filler as a reinforcement (Component D), (i) the resin composition containing, per 100% by weight of the total of Component A-2 and Component B, 65 to 99% by weight of Component A-2 and 1 to 35% by weight of Component B, and (ii) the resin composition containing, per 100 parts by weight of the total of Component A-2 and Component B, 1 to 100 parts by weight of Component D.

25. A flame-retardant resin composition containing (A) Component A-2 as a resin component (B) Component B as a flame retardant, (C) titanium dioxide as a pigment (Component C), and (D) an inorganic filler as a reinforcement (Component D), (i) the resin composition containing, per 100% by weight of the total of Component A-2 and Component B, 65 to 99% by weight of Component A-2 and 1 to 35% by weight of Component B, and (ii) the resin composition containing, per 100 parts by weight of the total of Component A-2 and Component B, 0.08 to 10 parts by weight of Component C and 1 to 100 parts by weight of Component D.

26. The flame-retardant resin composition of claim 24 or 25, wherein the inorganic filler (Component D) is at least one member selected from the group consisting of talc, mica, wollastonite, a glass fiber, a glass milled fiber and glass flakes.

27. A molded article formed of the flame-retardant resin composition recited in claim 1.

28. A molded article formed of the flame-retardant resin composition recited in any one of claims 3, 8, 9 and 10.

29. A molded article formed of the flame-retardant resin composition of any one of claims 20, 23, 24 and 25.

* * * * *